(12) United States Patent
Ozturk et al.

(10) Patent No.: US 12,538,267 B2
(45) Date of Patent: Jan. 27, 2026

(54) PAGING OPTIMIZATIONS FOR RELAY OPERATION

(71) Applicant: QUALCOMM Incorporated, San Diego, CA (US)

(72) Inventors: Ozcan Ozturk, San Diego, CA (US); Peng Cheng, Beijing (CN); Karthika Paladugu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 398 days.

(21) Appl. No.: 18/041,972

(22) PCT Filed: Oct. 21, 2020

(86) PCT No.: PCT/CN2020/122359
§ 371 (c)(1),
(2) Date: Feb. 16, 2023

(87) PCT Pub. No.: WO2022/082478
PCT Pub. Date: Apr. 28, 2022

(65) Prior Publication Data
US 2023/0328689 A1 Oct. 12, 2023

(51) Int. Cl.
*H04W 68/02* (2009.01)
*H04W 76/14* (2018.01)
*H04W 88/04* (2009.01)

(52) U.S. Cl.
CPC .......... *H04W 68/02* (2013.01); *H04W 76/14* (2018.02); *H04W 88/04* (2013.01)

(58) Field of Classification Search
None
See application file for complete search history.

(56) References Cited

U.S. PATENT DOCUMENTS 10,667,238 B2  5/2020  Balasubramanian
2017/0142653 A1*  5/2017  Qi ................. H04B 7/2606
(Continued)

FOREIGN PATENT DOCUMENTS

CN  104185278 A  12/2014
CN  106211245 A  12/2016
(Continued)

OTHER PUBLICATIONS

Huawei., et al., "Discussion and Approval", S2-175226, 3rd Generation Partnership Project (3GPP), Mobile Competence Centre, 650, Route Des Lucioles, F-06921, Sophia-Antipolis Cedex, France, vol. SA WG2, No. San Jose del Cabo, Mexico, Jun. 26, 2017-Jun. 30, 2017, Jul. 3, 2017, XP051310207, pp. 1-9, pp. 1-4, 6.
(Continued)

*Primary Examiner* — Frantz Bataille
(74) *Attorney, Agent, or Firm* — Loza & Loza, LLP

(57) ABSTRACT

Aspects relate to paging optimizations in relay operations. A remote UE may provide one or more paging identifiers identifying the remote UE to one or more relay UEs over respective relay links therebetween. Each relay UE may provide the paging identifier(s) of the remote UE to a respective serving radio access network (RAN) node, which may further provide the paging identifier(s) of the remote UE to an anchor RAN node and/or core network node to optimize paging of the remote UE. For example, paging of the remote UE may be limited to the cell(s) including the relay UE(s). The remote UE may further be configured to select to receive the paging message from one of the relay UEs or may receive the paging message from each of the relay UEs. A relay UE may further transmit a page reject message to reject a paging message.

25 Claims, 17 Drawing Sheets

(56) References Cited

U.S. PATENT DOCUMENTS

| | | |
|---|---|---|
| 2019/0261309 A1 | 8/2019 | Martin et al. |
| 2020/0187152 A1* | 6/2020 | Karampatsis ........... H04W 4/06 |

FOREIGN PATENT DOCUMENTS

| | | |
|---|---|---|
| CN | 108616830 A | 10/2018 |
| CN | 109788494 A | 5/2019 |
| CN | 109891947 A | 6/2019 |
| CN | 110402605 A | 11/2019 |
| CN | 111727641 A | 9/2020 |
| WO | 2018082869 A1 | 5/2018 |
| WO | 2018164821 A1 | 9/2018 |
| WO | 2018169343 A1 | 9/2018 |
| WO | 2018204099 | 11/2018 |

OTHER PUBLICATIONS

Supplementary Partial European Search Report—EP20958061—Search Authority—Berlin—Jun. 18, 2024.
International Search Report and Written Opinion—PCT/CN2020/122359—ISA/EPO—May 26, 2021.
Supplementary European Search Report—EP20958061—Search Authority—Berlin—Aug. 30, 2024.
ZTE Corporation., et al., "Initial Considerations for NR SL Relay" 3G PP TSG RAN WG2 Meeting # 111 electronic, R2-2006735, 3rd Generation Partnership Project (3GPP), Mobile Competence Centre, 650, Route Des Lucioles, F-06921 Sophia-Antipolis Cedex, France, vol. RAN wG2, No. electronic, Aug. 24, 2020-Sep. 4, 2020, Aug. 7, 2020, 8 Pages, XP052359857, pp. 3-6.

* cited by examiner

PAGING OPTIMIZATIONS FOR RELAY OPERATION

CROSS-REFERENCE TO RELATED APPLICATION

This application is the U.S. national stage of PCT patent application number PCT/CN2020/122359 filed on Oct. 21, 2020.

TECHNICAL FIELD

The technology discussed below relates generally to wireless communication networks, and more particularly, to sidelink relay paging optimizations.

INTRODUCTION

Communication networks have used relays in varying capacities. Relaying in cellular networks seeks to extend base station coverage, improve transmission reliability, and recover failed links due to, for example, blockage or fading. A relaying node may be a fixed node or a mobile device (e.g., a user equipment (UE)). Relaying between UEs may be achieved using D2D technology. D2D allows UEs to communicate over direct links, referred to herein as sidelinks, instead of through cellular network infrastructure. For example, a D2D relay link (sidelink) may be established between a relay UE and a remote UE to enable relaying of information between a base station and the remote UE via the relay UE.

A UE may further operate in a radio resource control (RRC) connected state, an RRC idle state, or an RRC inactive state. In the RRC idle and RRC inactive states, paging of the UE may be performed when the network needs to exchange data or control information with the UE. Relaying of paging messages from the base station to the remote UE may be supported by the relay UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a relay user equipment (UE) in a wireless communication network is disclosed. The method includes receiving, from a remote UE in wireless communication with the relay UE via a relay link, a paging identifier identifying the remote UE, and forwarding the paging identifier to a radio access network (RAN) node in wireless communication with the relay UE.

Another example provides a relay user equipment (UE) configured for wireless communication. The relay UE includes a transceiver, a memory, and a processor communicatively coupled to the transceiver and the memory. The processor and the memory are configured to receive, from a remote UE in wireless communication with the relay UE via a relay link, a paging identifier identifying the remote UE, and forward the paging identifier to a radio access network (RAN) node in wireless communication with the relay UE.

Another example provides a relay user equipment (UE) configured for wireless communication. The relay UE includes means for receiving, from a remote UE in wireless communication with the relay UE via a relay link, a paging identifier identifying the remote UE, and means for forwarding the paging identifier to a radio access network (RAN) node in wireless communication with the relay UE.

Another example provides an article of manufacture for use by a relay user equipment (UE) in a wireless communication network. The article of manufacture includes a non-transitory computer-readable medium having stored therein instructions executable by one or more processors of the relay UE to receive, from a remote UE in wireless communication with the relay UE via a relay link, a paging identifier identifying the remote UE and forward the paging identifier to a radio access network (RAN) node in wireless communication with the relay UE.

Another example provides a method of wireless communication at a relay user equipment (UE) in a wireless communication network. The method includes maintaining a list of registered remote UEs, each registered with the relay UE for relaying communication between the respective remote UE and a radio access network (RAN) node via a respective relay link. The method further includes receiving a paging message from the RAN node for a remote UE, where the paging message includes a paging identifier identifying the remote UE. The method further includes transmitting a page reject message to the RAN node to reject the paging message when the list of registered remote UEs does not include the paging identifier of the remote UE.

Another example provides a relay user equipment (UE) configured for wireless communication. The relay UE includes a transceiver, a memory, and a processor communicatively coupled to the transceiver and the memory. The processor and the memory are configured to maintain a list of registered remote UEs, each registered with the relay UE for relaying communication between the respective remote UE and a radio access network (RAN) node via a respective relay link. The processor and the memory are further configured to receive a paging message from the RAN node for a remote UE, where the paging message includes a paging identifier identifying the remote UE. The processor and the memory are further configured to transmit a page reject message to the RAN node to reject the paging message when the list of registered remote UEs does not include the paging identifier of the remote UE.

Another example provides a relay user equipment (UE) configured for wireless communication. The relay UE includes means for maintaining a list of registered remote UEs, each registered with the relay UE for relaying communication between the respective remote UE and a radio access network (RAN) node via a respective relay link. The relay UE further includes means for receiving a paging message from the RAN node for a remote UE, where the paging message includes a paging identifier identifying the remote UE. The relay UE further includes means for transmitting a page reject message to the RAN node to reject the paging message when the list of registered remote UEs does not include the paging identifier of the remote UE.

Another example provides an article of manufacture for use by a relay user equipment (UE) in a wireless communication network. The article of manufacture includes a non-transitory computer-readable medium having stored therein instructions executable by one or more processors of the relay UE to maintain a list of registered remote UEs, each registered with the relay UE for relaying communication between the respective remote UE and a radio access network (RAN) node via a respective relay link. The non-transitory computer-readable medium further includes instructions for causing the one or more processors of the relay UE to receive a paging message from the RAN node for a remote UE, where the paging message includes a paging identifier identifying the remote UE. The non-transitory computer-readable medium further includes instructions for causing the one or more processors of the relay UE to transmit a page reject message to the RAN node to reject the paging message when the list of registered remote UEs does not include the paging identifier of the remote UE.

Another example provides a method of wireless communication at a radio access network (RAN) node in a wireless communication network. The method includes receiving, from a relay user equipment (UE) in wireless communication with the RAN node, a paging identifier identifying a remote UE in wireless communication with the relay UE via a relay link, and utilizing the paging identifier in performing paging of the remote UE via the relay UE.

Another example provides a radio access network (RAN) node configured for wireless communication. The RAN node includes a transceiver, a memory, and a processor communicatively coupled to the transceiver and the memory. The processor and the memory are configured to receive, from a relay user equipment (UE) in wireless communication with the RAN node, a paging identifier identifying a remote UE in wireless communication with the relay UE via a relay link, and utilize the paging identifier in performing paging of the remote UE via the relay UE.

Another example provides a radio access network (RAN) node configured for wireless communication. The RAN node includes means for receiving, from a relay user equipment (UE) in wireless communication with the RAN node, a paging identifier identifying a remote UE in wireless communication with the relay UE via a relay link, and means for utilizing the paging identifier in performing paging of the remote UE via the relay UE.

Another example provides an article of manufacture for use by a radio access network (RAN) node in a wireless communication network. The article of manufacture includes a non-transitory computer-readable medium having stored therein instructions executable by one or more processors of the RAN node to receive, from a relay user equipment (UE) in wireless communication with the RAN node, a paging identifier identifying a remote UE in wireless communication with the relay UE via a relay link, and utilize the paging identifier in performing paging of the remote UE via the relay UE.

Another example provides a method for wireless communication at a remote user equipment (UE) in a wireless communication network. The method includes establishing a respective relay link with a plurality of relay UEs for relaying communication between the remote UE and a radio access network (RAN) node via at least one of the plurality of relay UEs, providing a paging identifier identifying the remote UE to each of the plurality of relay UEs, and receiving at least one instance of a plurality of instances of a paging message for the remote UE, each of the plurality of instances being received from a respective one of the plurality of relay UEs, where the paging message includes the paging identifier of the remote UE.

Another example provides a remote user equipment (UE) configured for wireless communication. The remote UE includes a transceiver, a memory, and a processor communicatively coupled to the transceiver and the memory. The processor and the memory are configured to establish a respective relay link with a plurality of relay UEs for relaying communication between the remote UE and a radio access network (RAN) node via at least one of the plurality of relay UEs, provide a paging identifier identifying the remote UE to each of the plurality of relay UEs, and receive at least one instance of a plurality of instances of a paging message for the remote UE, each of the plurality of instances being received from a respective one of the plurality of relay UEs, where the paging message includes the paging identifier of the remote UE.

Another example provides a remote user equipment (UE) configured for wireless communication. The remote UE includes means for establishing a respective relay link with a plurality of relay UEs for relaying communication between the remote UE and a radio access network (RAN) node via at least one of the plurality of relay UEs, means for providing a paging identifier identifying the remote UE to each of the plurality of relay UEs, and means for receiving at least one instance of a plurality of instances of a paging message for the remote UE, each of the plurality of instances being received from a respective one of the plurality of relay UEs, where the paging message includes the paging identifier of the remote UE.

Another example provides an article of manufacture for use by a remote user equipment (UE) in a wireless communication network. The article of manufacture includes a non-transitory computer-readable medium having stored therein instructions executable by one or more processors of the remote UE to establish a respective relay link with a plurality of relay UEs for relaying communication between the remote UE and a radio access network (RAN) node via at least one of the plurality of relay UEs, provide a paging identifier identifying the remote UE to each of the plurality of relay UEs, and receive at least one instance of a plurality of instances of a paging message for the remote UE, each of the plurality of instances being received from a respective one of the plurality of relay UEs, where the paging message includes the paging identifier of the remote UE.

Another example provides a method of paging at a core network node within a core network. The method includes receiving, from a radio access network (RAN) node in a wireless communication network, a paging identifier of a remote user equipment (UE) in wireless communication with a relay UE via a relay link. The RAN node can serve a cell including the relay UE. The method further includes transmitting a paging message for the remote UE to the RAN node for paging of the remote UE within the cell served by the RAN node. The paging message can include the paging identifier of the remote UE.

Another example provides a core network node within a core network. The core network node includes a network interface, a memory, and a processor communicatively coupled to the network interface and the memory. The processor and the memory are configured to receive, from a radio access network (RAN) node in a wireless communication network, a paging identifier of a remote user equipment (UE) in wireless communication with a relay UE via a relay link. The RAN node can serve a cell including the relay UE. The processor and the memory are further configured to transmit a paging message for the remote UE to the RAN node for paging of the remote UE within the cell served by the RAN node. The paging message can include the paging identifier of the remote UE.

Another example provides a core network node within a core network. The core network node includes means for receiving, from a radio access network (RAN) node in a wireless communication network, a paging identifier of a remote user equipment (UE) in wireless communication with a relay UE via a relay link. The RAN node can serve a cell including the relay UE. The core network node further includes means for transmitting a paging message for the remote UE to the RAN node for paging of the remote UE within the cell served by the RAN node. The paging message can include the paging identifier of the remote UE.

Another example provides an article of manufacture for use by a core network node within a core network. The article of manufacture includes a non-transitory computer-readable medium having stored therein instructions executable by one or more processors of the core network node to receive, from a radio access network (RAN) node in a wireless communication network, a paging identifier of a remote user equipment (UE) in wireless communication with a relay UE via a relay link. The RAN node can serve a cell including the relay UE. The non-transitory computer-readable medium further has stored therein instructions executable by the one or more processors of the core network node to transmit a paging message for the remote UE to the RAN node for paging of the remote UE within the cell served by the RAN node. The paging message can include the paging identifier of the remote UE.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
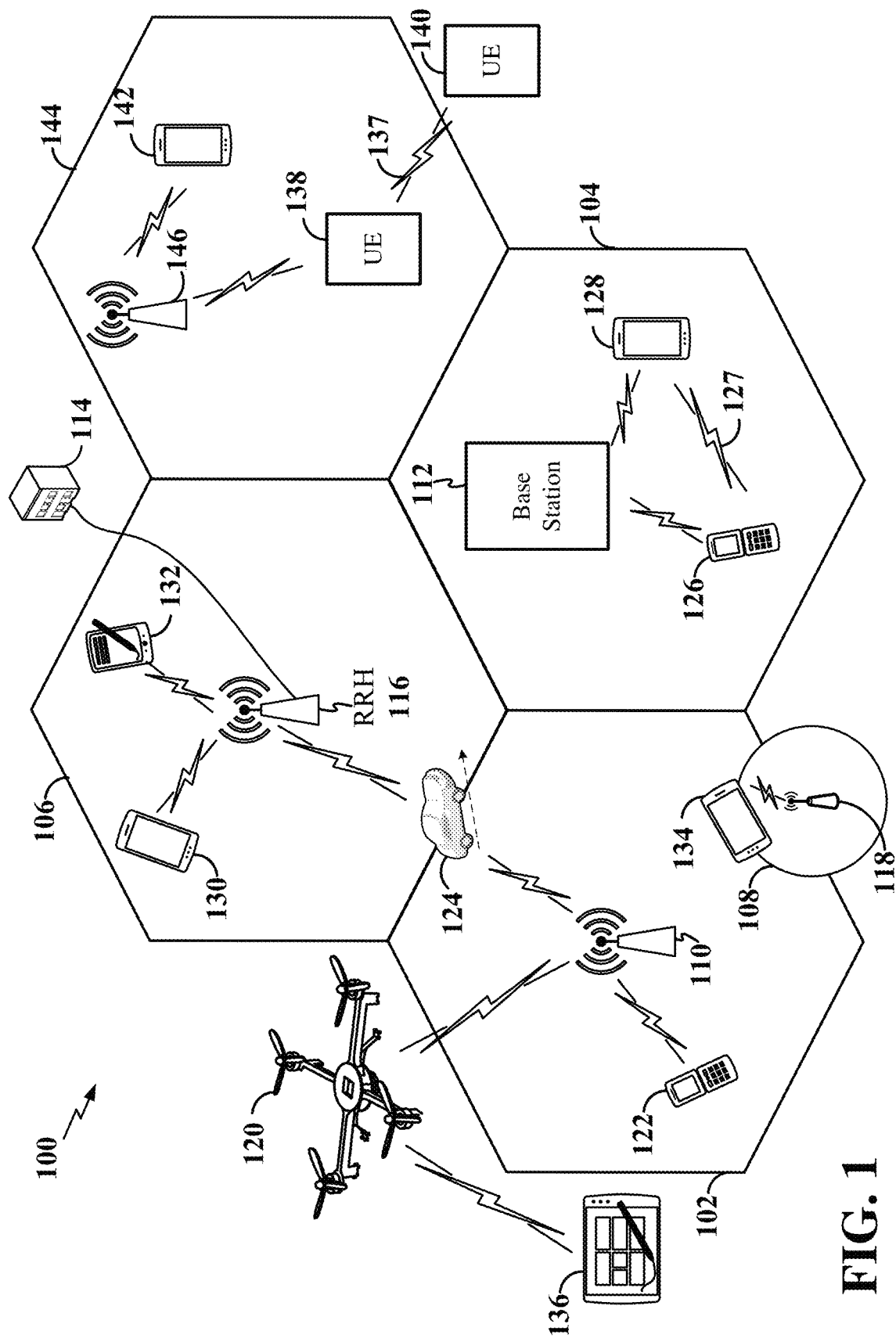
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to paging optimizations in relay operations. In some examples, a relay UE may receive one or more paging identifiers identifying a remote UE from the remote UE over a relay link (e.g., sidelink) between the relay UE and the remote UE. The relay UE may provide the paging identifier(s) of the remote UE to a radio access network (RAN) node (e.g., a base station) in wireless communication with the relay UE to optimize paging of the remote UE. For example, with knowledge of the relay link between the relay UE and the remote UE, paging of the remote UE may be limited to a cell including the relay UE. In some examples, the remote UE may select two or more relay UEs from which to receive paging messages. In this example, paging of the remote UE may be initiated within each cell including a relay UE associated with the remote UE. The remote UE may further be configured to select to receive the paging message from one of the relay UEs or may receive the paging message from each of the relay UEs for improved reception and decoding thereof.

In some examples, the relay UE may maintain a list of registered remote UEs and transmit a page reject message to the RAN node when a paging message received by the relay UE is intended for a remote UE that is not included within the list of registered remote UEs. For example, the list of registered remote UEs may include a list of paging identifiers for each of the remote UEs for which the relay UE has an established relay link therewith. The relay UE may compare a paging identifier included in a received paging message for a remote UE with the list of paging identifiers and transmit the page reject message when the paging identifier of the paging message is not included in the list.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, 144 and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, three base stations 110, 112, and 146 are shown in cells 102, 104, and 144, respectively; and a fourth base station 114 is shown controlling a remote radio head (RRH) 116 in cell 106. That is, a base station can have an integrated antenna or can be connected to an antenna or RRH by feeder cables. In the illustrated example, the cells 102, 104, 106, and 144 may be referred to as macrocells, as the base stations 110, 112, 114, and 146 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118, 146 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; UEs 138, 140, and 142 may be in communication with base station 146; and UE 136 may be in communication with mobile base station 120. Here, each base station 110, 112, 114, 118, 120, and 146 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, 146, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, 132, 138, 140, and 142 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 126 and 128) within the coverage area of a base station (e.g., base station 112) may communicate with the base station 112 over respective Uu links and may further communicate sidelink signals therebetween over a direct link (sidelink) 127 without conveying that communication through the base station 112. In some examples, the UEs 126 and 128 may each function as a scheduling entity or transmitting sidelink device and/or a scheduled entity or a receiving sidelink device to schedule resources and communicate the sidelink signals therebetween without relying on scheduling or control information from a base station. In other examples, the base station 112 may allocate resources to the UEs 126 and 128 for the sidelink communication. For example, the sidelink signaling may be implemented in a device-to-device (D2D) network, peer-to-peer (P2P) network, vehicle-to-vehicle (V2V) network, a vehicle-to-everything (V2X) network, an Internet of Everything (IoT) network, a mesh network, or other suitable direct link network.

The sidelink communication between UEs 126 and 128 may occur over a sidelink 127 therebetween utilizing a proximity service (ProSe) PC5 interface. The PC5 interface may be utilized to support D2D sidelink communication in V2V and V2X networks, along with various other D2D proximity use cases. Examples of other proximity use cases include, but are not limited to, public safety or commercial (e.g., entertainment, education, office, medical, and/or interactive) based proximity services. ProSe communication may further support different operational scenarios, such as in-coverage, out-of-coverage, and partial coverage. Out-of-coverage refers to a scenario in which the UEs are outside of the coverage area of a base station (e.g., base station 112), but each are still configured for ProSe communication. Partial coverage refers to a scenario in which some of the UEs are outside of the coverage area of the base station, while other UEs are in communication with the base station. In-coverage refers to a scenario, as shown in FIG. 1, in which UEs (e.g., UEs 126 and 128) are in communication with the base station 112 (e.g., gNB) via a Uu (e.g., cellular interface) connection to receive ProSe service authorization and provisioning information to support ProSe operations. ProSe communication may further utilize a licensed spectrum or an unlicensed spectrum.

Sidelink signaling may further be utilized to facilitate relaying to provide improved coverage for UEs. For example, in D2D systems, two or more UEs (e.g., UEs 138 and 140) may communicate over a direct link with one another without traversing a base station (e.g., base station 146). Here, D2D communication may refer to sidelink communication or relaying communication utilizing sidelink signals. In various aspects, a D2D relay framework may be included within a cellular network to facilitate relaying of communication to/from the base station 146 via D2D links (referred to herein as sidelinks or relay links 137). For example, one or more UEs (e.g., UE 138) within the coverage area of the base station 146 may operate as relaying UEs to extend the coverage of the base station 146, improve the transmission reliability to one or more UEs (e.g., UE 140), and/or to allow the base station to recover from a failed UE link due to, for example, blockage or fading.

To facilitate D2D communication between UEs 138 and 140 over the relay link (e.g., sidelink) 137, UE 138 may be configured to transmit a discovery signal to UE 140. The discovery signal may be utilized by the UE 140 to measure the signal strength and channel status of a potential sidelink (e.g., sidelink 137) with another UE (e.g., UE 138). The UE 140 may utilize the measurement results to select a UE (e.g., UE 138) for sidelink communication or relay communication. In some examples, the sidelink or relay link 137 between UE 138 and UE 140 may be established as part of a relay node switching process. For example, the UE 140 may have a relay connection to the base station 146 via another UE (e.g., UE 142). The UE 140 may then select UE 138 as a relay node switch target to switch relaying communication with the base station 146 from UE 142 to UE 138. Relay node switching may be performed, for example, due to one or more factors, such as movement of the UE 140 and/or UE 142, channel variance, a battery status change, and/or a load status change.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
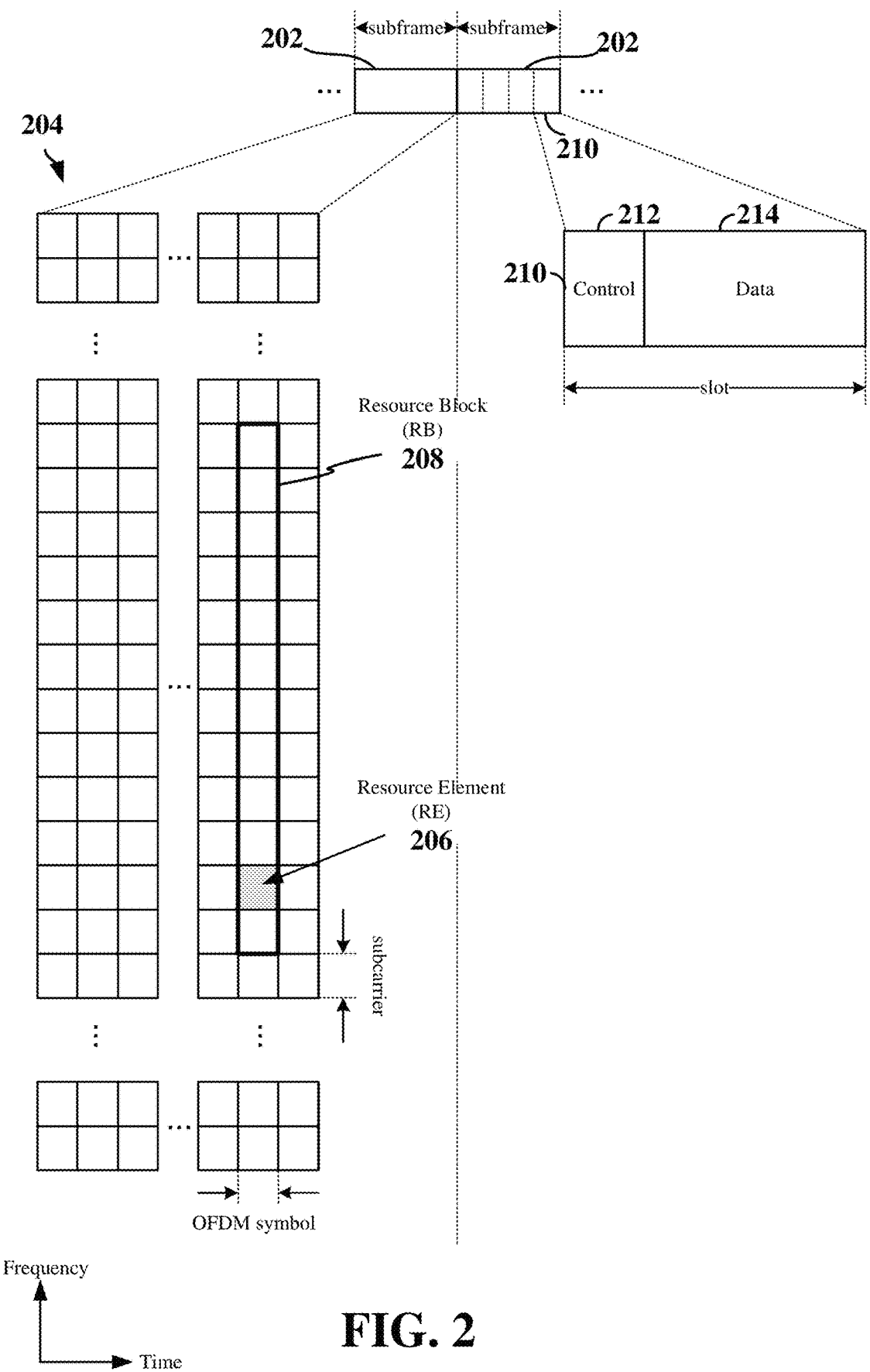
FIG. 2 is a diagram illustrating an example of a frame structure for use in a radio access network according to some aspects.

Referring now to FIG. 2, an expanded view of an exemplary DL subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of sub carriers.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs (e.g., scheduled entities) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station or may be self-scheduled by a UE implementing D2D sidelink communication. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1 and 2 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 3:
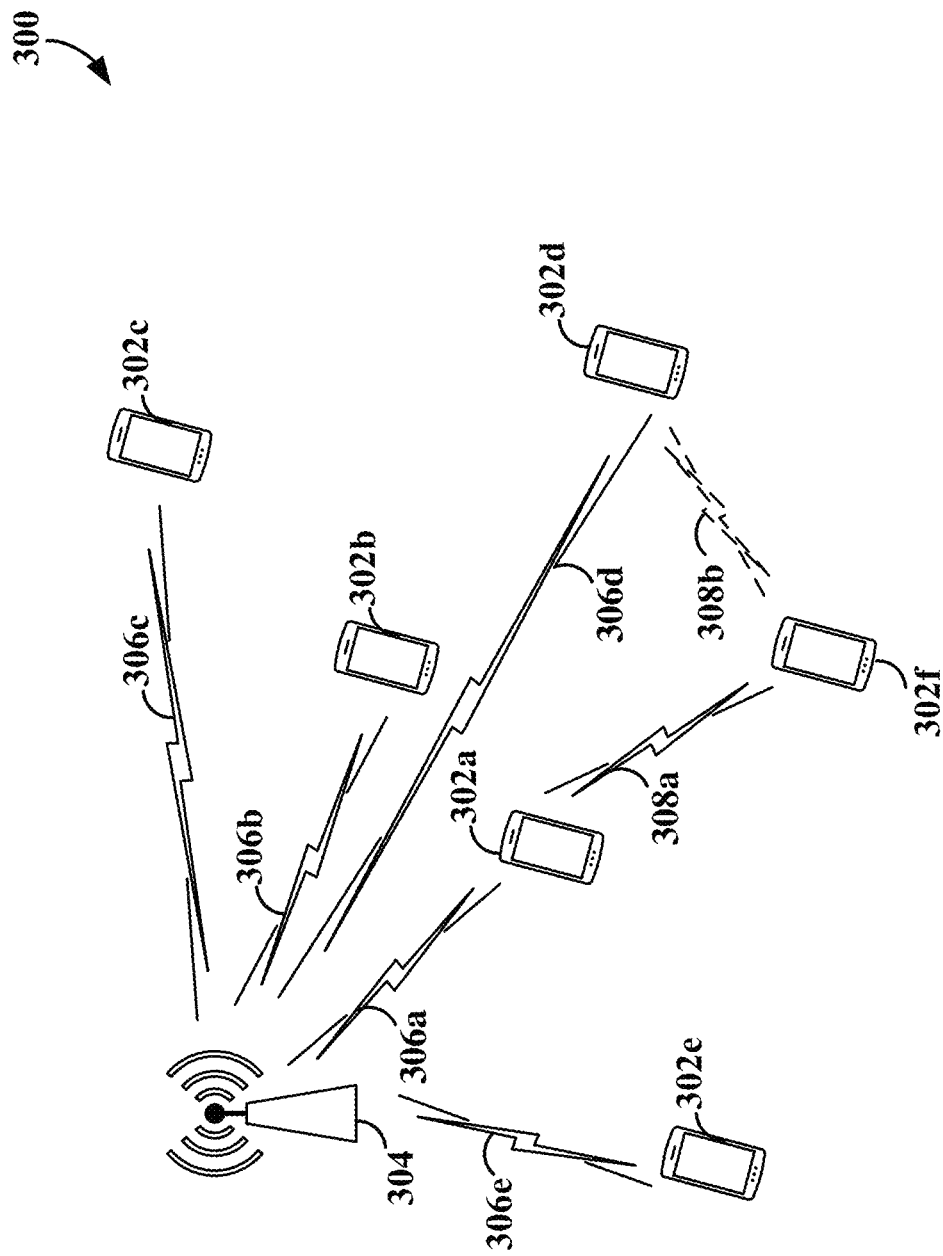
FIG. 3 is a diagram illustrating an exemplary wireless network employing D2D relaying according to some aspects.

FIG. 3 is a diagram illustrating an exemplary wireless network 300 employing D2D relaying. The wireless network 300 may correspond, for example, to the RAN 100 illustrated in FIG. 1. The wireless network 300 may include a fifth generation base station (e.g., a gNB) 304 in wireless communication with one or more UEs 302a, 302b, 302c, 302d, and 302e. In the example shown in FIG. 3, the base station 304 may communicate with each of the UEs 302a, 302b, 302c, 302d, and 302e via a respective wireless communication link (e.g., a Uu link) 306a, 306b, 306c, 306d, and 306e.

In addition, a D2D relay link 308a may be established between UE 302a and another UE 302f to enable relaying of information between the base station 304 and the UE 302f The relay link 308a may be a sidelink that provides a PC5 path between the UE 302a and the UE 302f In this example, the relay link (sidelink) 308a may be established between the UE 302a and UE 302f due to distance or signal blocking between the base station 304 and UE 302f, weak receiving capability of the UE 302f, low transmission power of the UE 302f, and/or limited battery capacity of UE 302f Thus, relay link 308a may be established when the UE 302f is in-coverage or out-of-coverage of the base station 304. The relay link 308a between UEs 302a and 302f may enable communication between the base station 304 and UE 302f to be relayed via UE 302a over wireless communication link (e.g., the Uu interface) 306a and relay link (e.g., sidelink) 308a.

In the example shown in FIG. 3, the UE 302a may be referred to as a source relay UE, UEs 302b-302e may be referred to as neighbor relay UEs, and the UE 302f may be referred to as a remote UE. In some examples, the source relay UE 302a may initiate a relay node switch of the remote UE 302f from the source relay UE 302a to one of the neighbor relay UEs 302b-302e (e.g., due to movement of UE 302a or 302f, channel variance of the channel between UE 302a and 302f, a battery status change of UE 302a or 302f, and/or a load status change associated with UE 302a). For example, the relay node switch may be performed from the source relay UE 302a to the neighbor relay UE 302d to enable communication between the base station 304 and the remote UE 302f via another relay link 308b between the remote UE 302f and the neighbor relay UE 302d.

As shown in FIG. 3, the remote UE 302f may generally connect to the source relay UE 302a via a layer 3 (L3) connection with no Uu connection with (and no visibility to) the network or via a layer 2 (L2) connection where the remote UE 302f supports Uu access stratum (AS) and non-AS connections (NAS) with the network. When there is no direct connection path (Uu connection) between the remote UE 302f and the network (e.g., an L3 connection), the remote UE 302f is connected to the relay UE 302a via PC5 connection only (e.g., Layer 3 UE-to-NW). In this example, the relay UE 302a may report to the 5G core network (5GC) about the remote UE's presence. In other examples, the remote UE 302f may be visible to the 5GC via a non-3GPP interworking function (N3IWF). When there is a direct connection path between the remote UE 302f and the network (e.g., an L2 connection), the remote UE 302f may support the NR Uu AS and NAS connections above the PC5 radio link control (RLC) layer. The NG-RAN (e.g., base station 304) may control the remote UE's PC5 link via NR radio resource control (RRC) signaling. Various aspects discussed herein are directed to an L2 relay connection between the remote UE 302f and the network.

The wireless network 300 may further support discovery for both relay selection and reselection. For example, neighboring UEs 302a-302e may send discovery messages that may be received by the remote UE 302f The remote UE 302f may measure the signal strength and channel status of potential relay links with the neighboring UEs 302a-302f and utilize the measurement results to select the relay UE (source relay UE 302a or neighbor relay UE 302d) for relay communication. In other examples, the remote UE 302f may transmit a solicitation message that may be received by one or more neighbor UEs 302a-302e. The remote UE 302f may then wait for responses from the neighbor UEs 302a-302e to select a relay UE (e.g., source relay UE 302a or neighbor relay UE 302d). Such discovery/solicitation messages may be sent on a PC5 communication channel and carried within the same Layer-2 frames as those used for other direct communication including, for example, a Destination Layer-2 ID that can be set to a unicast, groupcast or broadcast identifier, a Source Layer-2 ID that is always set to a unicast identifier of the transmitter, and a frame type indicates that it is a ProSe Direct Discovery message.

In some examples, the remote UE 302f may operate in a discontinuous reception (DRX) mode. The DRX mode allows the remote UE 302f to remain in a low-power state, such as a sleep state, for a period of time. Between sleep periods, the UE may wake-up (e.g., perform a power-up operation) to enter an active state and communicate with the network. The remote UE 302f may enter the DRX mode in a radio resource control (RRC) connected state (connected mode DRX (C-DRX)) or an RRC idle state or RRC inactive state (idle mode DRX (I-DRX)). In C-DRX, the UE may be configured with a DRX ON duration and a DRX OFF duration. During the DRX ON duration, the UE may wake-up and monitor for a physical downlink control channel (PDCCH) and transmit or receive user data traffic. In I-DRX, the UE may periodically wake-up during DRX ON durations to receive a page based on a paging cycle.

In the RRC idle state, a UE does not have an RRC connection with the core network or NG-RAN. Therefore, when incoming data traffic or control signaling for the remote UE 302f arrives at the core network, paging may be initiated by a core network node (e.g., the AMF) to deliver the data traffic to the remote UE 302f. For example, the AMF may generate and transmit a paging message for the remote UE 302f. The paging message may include a serving temporary subscriber identity (S-TMSI) identifying the remote UE 302f. The paging message may then be broadcast within a registration area of the remote UE 302f. Here, a registration area is a set of tracking areas, specifically grouped for a UE based on the UEs mobility pattern. The registration area for the remote UE 302f may be configured, for example, during an initial registration of the remote UE 302f with the core network (e.g., in response to a registration request transmitted to the core network upon powering up or entering a new registration area). The registration area may, therefore, correspond to a paging area within which the remote UE 302f may be paged in idle state.

In addition, the S-TMSI may further be assigned to the remote UE 302f upon initially registering with the core network. The S-TMSI may further be used by both the remote UE 302f and the NG-RAN (e.g., base station 304) as a paging identifier for the remote UE 302f and to determine the paging frames and paging occasions within the paging frames for the remote UE 302f. Here, a paging frame corresponds to a radio frame in which the UE may wake-up to receive a page. In addition, a paging occasion corresponds to a subframe or slot where a paging message intended for the UE may be received. In one DRX cycle (paging cycle), there is only one paging occasion for each UE. In some examples, the paging cycle of the remote UE 302f may follow a normal paging cycle (e.g., 1.28 ms) utilized in the wireless network 300. For example, the remote UE 302f and base station 304 may each utilize the 10 least significant bits of the S-TMSI, along with the remote UE paging cycle and other suitable parameters, to determine the paging occasions for the remote UE 302f. Therefore, upon receiving a paging message for the remote UE 302f, the base station 304 may utilize the S-TMSI included in the paging message to determine the next paging occasion for the remote UE 302f and broadcast the paging message including the S-TMSI of the remote UE 302f during the next paging occasion.

In the RRC inactive state, a UE does not have an RRC connection with the core network, but does have an RRC connection with the NG-RAN. A UE may enter the RRC inactive state when RRCConnectionRelease is received with suspendConfig that includes an inactive radio network temporary identifier (I-RNTI) assigned to the UE by the NG-RAN. The I-RNTI identifies the UE in the network and may be utilized as a paging identifier for paging of the UE. After reception of the suspendConfig, the UE stores the UE context (e.g., AS context and the current RRC configuration) and suspends all signaling radio bearers (SRBs) and data radio bearers (DRBs) (except SRB0). The I-RNTI may be assigned to the remote UE 302f by an anchor base station (e.g., base station 304) for the remote UE 302f.

The anchor base station 304 stores the UE context of the RRC inactive UE (e.g., remote UE 302f) and initiates paging of the inactive remote UE 302f upon, for example, receiving data traffic for the remote UE 302f from the core network, receiving a public warning system (PWS) or earthquake and tsunami warning system (ETWS) emergency warning message, or modifying system information in a common or dedicated system information block (SIB). Paging of the inactive remote UE 302f may be performed within a RAN-based notification area (RNA). The RNA may include one or more cells, one or more RAN areas, or one or more tracking areas. The RNA may be UE-specific (e.g., based on the UEs mobility pattern) and configurable by the NG-RAN. The RNA is generally smaller than the registration area for the remote UE 302f. In such RAN-initiated paging, the anchor base station 304 may generate and broadcast a paging message including the I-RNTI of the remote UE 302f within all cells in the RNA. Thus, the anchor base station 304 may forward the paging message to one or more neighbor base stations (e.g., neighbor gNBs or ng-eNBs) within the RNA for broadcast within the cell(s) served by the neighbor base stations. As with the S-TMSI, the remote UE 302f and anchor base station 304 may utilize the I-RNTI to determine the paging occasion(s) of the remote UE 302f.

To facilitate relaying of paging messages to the remote UE 302f via a connected or source relay UE (e.g., relay UE 302a), the remote UE 302f may provide its paging identifier(s), such as the S-TMSI and/or I-RNTI, and/or paging occasion(s) to the relay UE 302a. The relay UE 302a may then monitor for a paging message for the remote UE 302f during each paging occasion and forward any paging message for the remote UE 302f received from the base station 304 to the remote UE 302f via the relay link.

Figure 4:
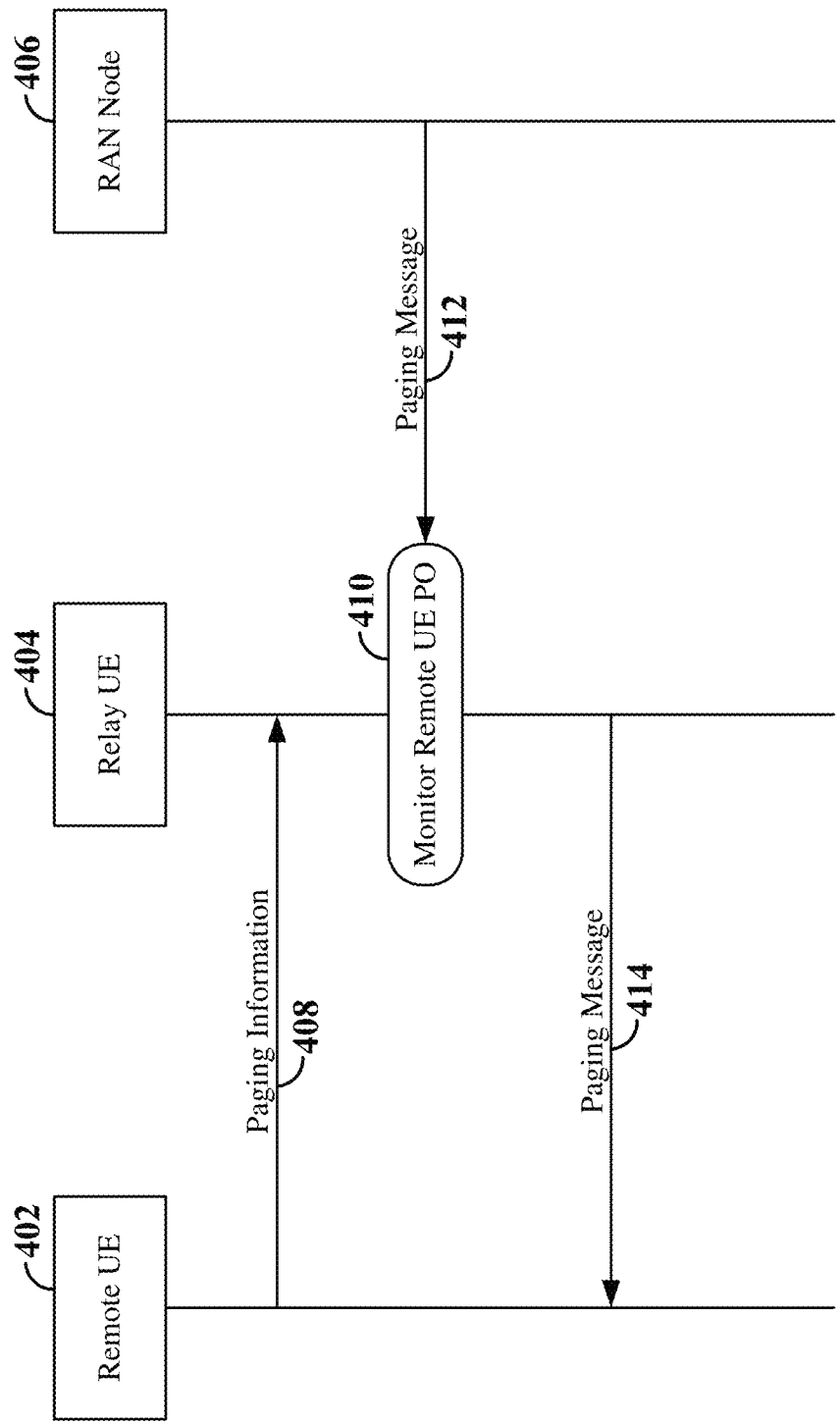
FIG. 4 is a signaling diagram illustrating an example of relaying paging messages according to some aspects.

FIG. 4 is a signaling diagram illustrating an example of relaying paging messages from a radio access network (RAN) node 406 to a remote UE 402 via a relay UE 404 according to some aspects. The RAN node 406 may correspond to any of the base stations (e.g., gNBs) or scheduling entities illustrated in FIGS. 1 and/or 3. Each of the remote UE 402 and relay UE 404 may correspond to any of the UEs or scheduled entities illustrated in FIGS. 1 and/or 3.

In the example shown in FIG. 4, the remote UE 402 and relay UE 404 may establish a relay link (sidelink) therebetween over a PC5 interface. At 408, when the remote UE 402 enters an RRC idle state or RRC inactive state, the remote UE 402 may transmit paging information associated with the remote UE 402 to the relay UE 404 over the sidelink. The paging information may be transmitted, for example, within a PC5 RRC message. For example, the PC5 RRC message may include a SidelinkUEInformationPC5 message. The paging information may include, for example, one or more paging identifier(s) of the remote UE 402. In examples in which the remote UE 402 is in an RRC idle state, the paging identifier may include the S-TMSI. In examples in which the remote UE 402 is in an RRC inactive state, the paging identifier may include the I-RNTI. In some examples, the paging information may further include the paging cycle (e.g., core network paging cycle and/or RAN paging cycle) of the remote UE 402.

From the paging identifier and the paging cycle, the relay UE 404 may calculate the paging occasions for the remote UE 402. In other examples, the remote UE 402 may calculate its paging occasions and include the calculated paging occasions within the paging information sent to the relay UE 404. At 410, the relay UE 404 may then monitor for a paging message for the remote UE 402 during a paging occasion of the remote UE 402. For example, as shown in FIG. 4, at 412, the RAN node 406 may broadcast a paging message including the I-RNTI or S-TMSI of the remote UE 402 within one or more cells served by the RAN node 406 during the paging occasion for the remote UE 402. Upon receiving the paging message, at 414, the relay UE 404 may forward the paging message to the remote UE 402.

Since the RAN node 406 is unaware of the remote UEs 402 relay link with the relay UE 404 while the remote UE 402 is in an RRC idle or RRC inactive state, the paging message is broadcast within each of the cells located within a registration area (e.g., for core network (CN)-initiated paging when the remote UE 402 is in the RRC idle state) or an RNA (e.g., for RAN-initiated paging when the remote UE 402 is in the RRC inactive state). This may result in inefficient utilization of resources to page a remote UE 402 when the remote UE 402 has a relay link with an RRC connected relay UE 404.

Therefore, various aspects provide for paging optimizations in relay operations. In some examples, a relay UE (e.g., relay UE 404) may provide the paging identifier(s) of the remote UE 402 to the RAN node 406 to optimize paging of the RRC idle or RRC inactive remote UE 402. For example, with knowledge of the relay link between the relay UE 404 and the remote UE 402, paging of the remote UE 402 may be limited to the cell serving the relay UE 404, thus decreasing the amount of resources utilized in paging the remote UE 402.

In some examples, the RAN node 406 may further provide the paging identifier (e.g., S-TMSI) of the remote UE 402 to a core network node (e.g., the AMF) within the core network when the remote UE 402 is in the RRC idle state. The AMF may then associate the RRC idle remote UE 402 with the RAN node 406 and initiate CN paging within a cell served by the RAN node that includes the relay UE 404. In some examples, the AMF may transmit a paging message including the S-TMSI of the remote UE 402 to the RAN node 406 for broadcast by the RAN node 406 within only the cell including the relay UE 404.

In some examples, the RAN node 406 may provide the paging identifier (e.g., I-RNTI) of the remote UE 402 to an anchor RAN node (e.g., anchor gNB) in the NG-RAN when the remote UE 402 is in the RRC inactive state. The anchor RAN node may then associate the RRC inactive remote UE 402 with the serving RAN node 406 and initiate RAN paging within the cell including the relay UE 404. In some examples, the anchor RAN node may transmit a paging message including the I-RNTI of the remote UE 402 to the serving RAN node 406 for broadcast by the RAN node within only the cell including the relay UE 404.

In some examples, the RAN node 406 may further forward the S-TMSI of the remote UE 402 to the anchor RAN node. In this example, the anchor RAN node may forward the S-TMSI of the remote UE 402 to the AMF. For example, the anchor RAN node may forward the S-TMSI of the remote UE 402 to the AMF to enable paging of the remote UE within the cell including the relay UE 404 when the RRC connection between the remote UE 402 and the core network is lost (e.g., due to re-boot of the anchor RAN node or other error condition).

In some examples, a 5G NR network may support a multi-hop relay in which communications between the RAN node 406 and the remote UE 402 may be relayed via two or more relay UEs. In this example, the remote UE 402 may establish a first relay link with a first relay UE. The first relay UE may further establish a second relay link with a second relay UE. The second relay UE may have a Uu link with the RAN node 406. It should be understood that other relay links may also be established between the second relay UE and the RAN node 406 for multi-hop relays including more than two relay UEs. In this example, the paging identifier(s) of the remote UE 402 may be provided to the first relay UE, which may then provide the paging identifier(s) of the remote UE 402 to the second relay UE. The second relay UE may then provide the paging identifier(s) of the remote UE 402 to the RAN node 406.

In some examples, the remote UE 402 may select two or more relay UEs from which to receive paging messages to improve paging reliability. For example, the remote UE 402 may establish relay links with two or more relay UEs in the same or different cells, which may be served by the same or different RAN nodes. The remote UE 402 may provide its paging identifier(s) to the different relay UEs, and each of the relay UEs may further provide the paging identifier(s) of the remote UE 402 to their respective RAN node(s). Each RAN node may then further provide the paging identifier(s) of the remote UE 402 to the core network (e.g., AMF) and/or anchor RAN node. In this example, paging of the remote UE 402 may be initiated within each cell including a relay UE associated with the remote UE 402. Upon receiving a respective instance of a paging message for the remote UE 402, each relay UE may forward the respective instance of the paging message to the remote UE 402. The remote UE 402 may then select one of the paging message instances to receive (e.g., decode) or may receive each of the paging message instances and combine the paging message instances to produce a combined paging message (e.g., for improved reception/decoding). Selection of a paging message instance may be performed, for example, based on a channel quality of each of the relay links.

In some examples, the relay UE 404 may maintain a list of registered remote UEs and transmit a page reject message to the RAN node 406 when a paging message received by the relay UE 404 is intended for a remote UE 402 that is not included within the list of registered remote UEs. Here, the relay UE 404 may determine the intended recipient of the paging message from the paging identifier (e.g., S-TMSI or I-RNTI) included within the paging message. For example, the list of registered remote UEs may include a list of paging identifiers (e.g., S-TMSIs and/or I-RNTIs) for each of the remote UEs for which the relay UE has an established relay link therewith. The relay UE 404 may compare the paging identifier included in the paging message with the list of paging identifiers and transmit the page reject message when the paging identifier of the paging message is not included in the list. Upon receiving the page reject message, the network may either expand paging to include the registration area or RNA or may remove the association between the paging identifier of the remote UE and the cell including the relay UE when more than one cell is associated with the paging identifier of the remote UE. In addition, the relay UE may experience power savings by not forwarding paging messages for remote UEs to which the relay UE is not connected.

Figure 5:
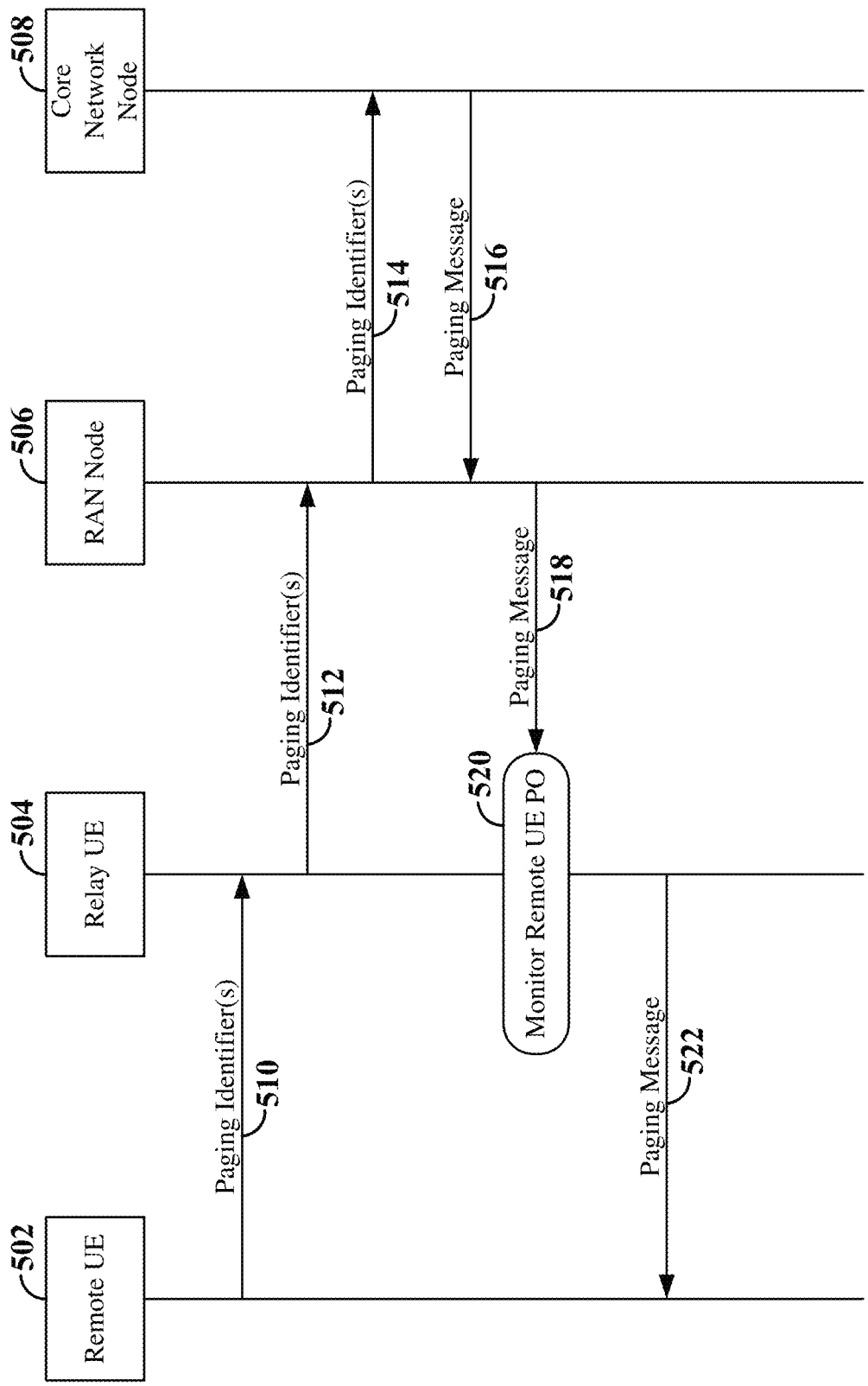
FIG. 5 is a signaling diagram illustrating an example of paging optimization for relay operation according to some aspects.

FIG. 5 is a signaling diagram illustrating an example of paging optimization for relay operation according to some aspects. FIG. 5 illustrates an example of core network (CN)-initiated paging of a remote UE 502 by a core network node 508 and relaying of CN-initiated paging from a radio access network (RAN) node 506 to the remote UE 502 via a relay UE 504 when the remote UE 502 is in an RRC idle state. The RAN node 506 may correspond to any of the base stations (e.g., gNBs) or scheduling entities illustrated in FIGS. 1, 3 and/or 4. Each of the remote UE 502 and relay UE 504 may correspond to any of the UEs or scheduled entities illustrated in FIGS. 1, 3, and/or 4. In addition, the core network node 508 may correspond to an AMF or other suitable core network node that may facilitate paging.

In the example shown in FIG. 5, the remote UE 502 and relay UE 504 may establish a relay link (sidelink) therebetween over a PC5 interface. At 510, when the remote UE 502 enters an RRC idle state, the remote UE 502 may transmit paging identifier(s) identifying the remote UE 502 to the relay UE 504 over the relay link. For example, the paging identifier(s) may include the S-TMSI. The paging identifier(s) may be transmitted, for example, within paging information that may further include the paging cycle or paging occasions of the remote UE 502. The paging information may be transmitted, for example, within a PC5 RRC message. For example, the PC5 RRC message may include a SidelinkUEInformationPC5 message.

At 512, the relay UE 504 may forward the paging identifier(s) of the remote UE 502 to the RAN node 506 via, for example, a Uu link. In some examples, the RAN node 506 may store the paging identifier(s) of the remote UE 502 and associate the paging identifier(s) of the remote UE 502 with a serving cell of the relay UE 504 (e.g., the cell to which the relay UE is attached). For example, the RAN node 506 may maintain a cell ID table of paging identifiers and corresponding cell identifiers (Cell IDs) for each of the paging identifiers. Here, the corresponding cell ID for each paging identifier is the cell ID of the relay UE 504 that forwarded the paging identifier.

At 514, the RAN node 506 may further forward the paging identifier(s) of the remote UE 502 to the core network node 508. In some examples, the core network node 508 may store the paging identifier(s) of the remote UE 502 and associate the paging identifier(s) of the remote UE 502 with the serving RAN node 506 of the relay UE 504. For example, the core network node 508 may maintain a RAN node table of paging identifiers and corresponding RAN nodes for each of the paging identifiers. Here, the corresponding RAN node for each paging identifier is the serving RAN node 506 of the relay UE 504 that forwarded the paging identifier to the RAN node 506.

The core network node 508 may then initiate paging of the remote UE 502 within the cell associated with the relay UE 504. For example, at 516, the core network node 508 may generate a paging message including the S-TMSI of the remote UE 502 and transmit the paging message to the serving RAN node 506 of the relay UE 504 (e.g., based on the RAN node table). For example, the core network node 508 may index on the S-TMSI of the remote UE 502 in the RAN node table to determine the RAN node 506 to which to send the paging message.

At 518, the RAN node 506 may then broadcast the paging message within the cell including the relay UE 504 (e.g., based on the S-TMSI included in the paging message and the cell ID table). For example, the RAN node 506 may index on the S-TMSI included the received paging message in the cell ID table to determine the cell ID of the cell within which to page the remote UE 502. The RAN node 506 may broadcast the paging message during a paging occasion of the remote UE 502 (e.g., as determined from the S-TMSI included in the paging message).

At 520, the relay UE 504 may monitor for the paging message for the remote UE 502 during the paging occasion of the remote UE 502. The relay UE 504 may calculate the paging occasion based on, for example, the S-TMSI and paging cycle of the remote UE 502 or the relay UE 504 may receive the paging occasion within the paging information provided by the remote UE 502. Upon receiving the paging message from the RAN node 506 within the paging occasion, at 522, the relay UE 504 may forward the paging message to the remote UE 502 via the relay link therebetween.

Figure 6:
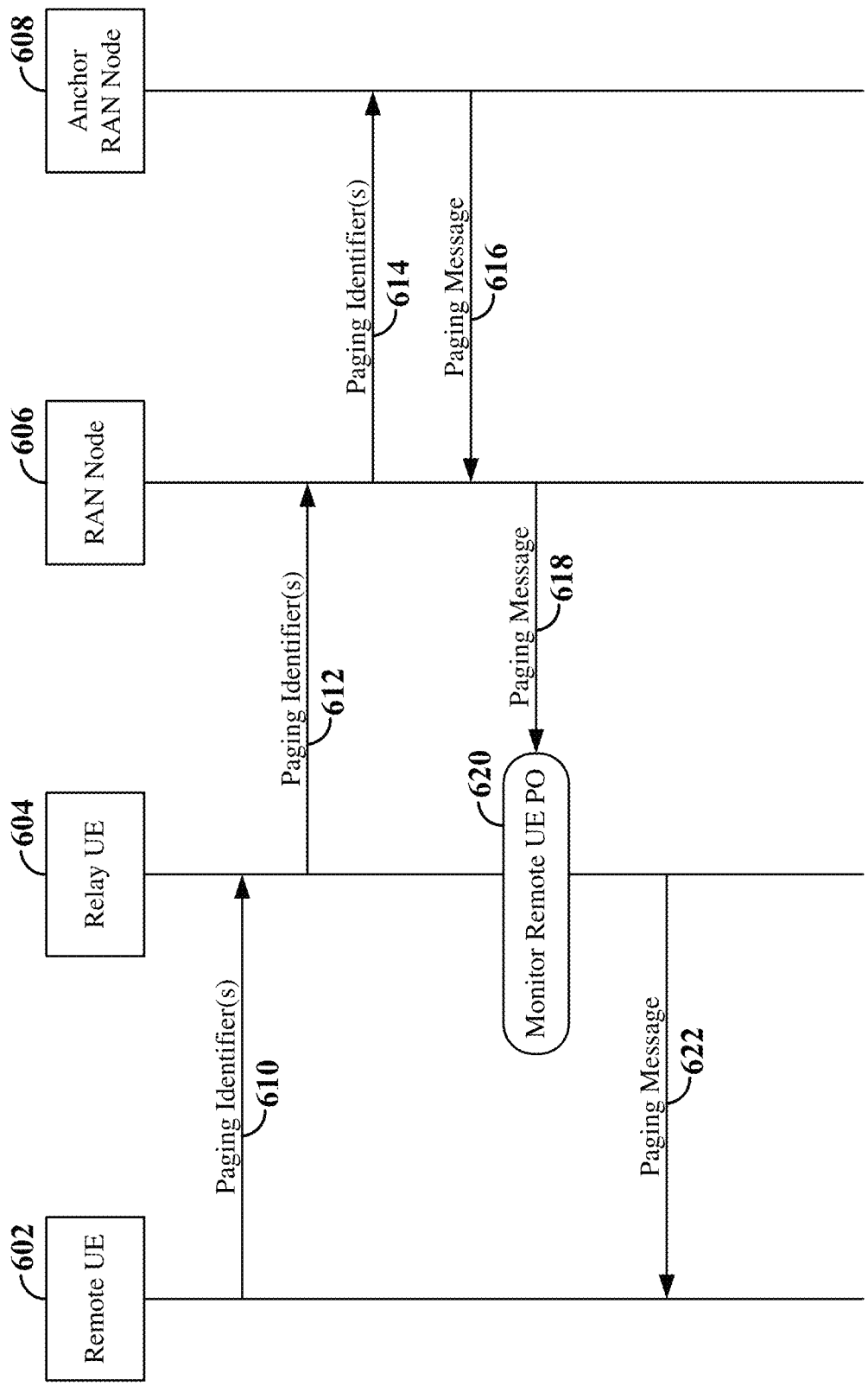
FIG. 6 is a signaling diagram illustrating another example of paging optimization for relay operation according to some aspects.

FIG. 6 is a signaling diagram illustrating another example of paging optimization for relay operation according to some aspects. FIG. 6 illustrates an example of RAN-initiated paging of a remote UE 602 by an anchor RAN node 608 and relaying of RAN-initiated paging from a serving RAN node 606 to the remote UE 602 via a relay UE 604 when the remote UE 602 is in an RRC inactive state. The RAN node 606 and anchor RAN node 608 may each correspond to any of the base stations (e.g., gNBs) or scheduling entities illustrated in FIGS. 1, 3 and/or 4. In addition, each of the remote UE 602 and relay UE 604 may correspond to any of the UEs or scheduled entities illustrated in FIGS. 1, 3, and/or 4.

In the example shown in FIG. 6, the remote UE 602 and relay UE 604 may establish a relay link (sidelink) therebetween over a PC5 interface. At 610, when the remote UE 602 enters an RRC inactive state, the remote UE 602 may transmit paging identifier(s) identifying the remote UE 602 to the relay UE 604 over the relay link. For example, the paging identifier(s) may include the I-RNTI. In some examples, the paging identifier(s) may include both the I-RNTI and the S-TMSI. The paging identifier(s) may be transmitted, for example, within paging information that may further include the paging cycle or paging occasions of the remote UE 602. The paging information may be transmitted, for example, within a PC5 RRC message. For example, the PC5 RRC message may include a SidelinkUE-InformationPC5 message.

At 612, the relay UE 604 may forward the paging identifier(s) of the remote UE 602 to the serving RAN node 606 via, for example, a Uu link. In some examples, the serving RAN node 606 may store the paging identifier(s) of the remote UE 602 and associate the paging identifier(s) of the remote UE 602 with a serving cell of the relay UE 604 (e.g., the cell to which the relay UE is attached). For example, the serving RAN node 606 may maintain a cell ID table of paging identifiers and corresponding cell identifiers (Cell IDs) for each of the paging identifiers. Here, the corresponding cell ID for each paging identifier is the cell ID of the relay UE 604 that forwarded the paging identifier.

At 614, the serving RAN node 606 may further forward the paging identifier(s) of the remote UE 602 to the anchor RAN node 608. In some examples, the anchor RAN node 608 may store the paging identifier(s) of the remote UE 602 and associate the paging identifier(s) of the remote UE 602 with the serving RAN node 606 of the relay UE 604. For example, the anchor RAN node 608 may maintain a RAN node table of paging identifiers and corresponding serving RAN nodes for each of the paging identifiers. Here, the corresponding serving RAN node for each paging identifier is the serving RAN node 606 of the relay UE 604 that forwarded the paging identifier to the serving RAN node 606.

The anchor RAN node 608 may then initiate paging of the remote UE 602 within the cell associated with the relay UE 604. For example, at 616, the anchor RAN node 608 may generate a paging message including the I-RNTI of the remote UE 602 and transmit the paging message to the serving RAN node 606 of the relay UE 604 (e.g., based on the RAN node table). For example, the anchor RAN node 608 may index on the I-RNTI of the remote UE 602 in the RAN node table to determine the serving RAN node 606 to which to send the paging message.

At 618, the serving RAN node 606 may then broadcast the paging message within the cell including the relay UE 604 (e.g., based on the I-RNTI included in the paging message and the cell ID table). For example, the serving RAN node 606 may index on the I-RNTI included the received paging message in the cell ID table to determine the cell ID of the cell within which to page the remote UE 602. The serving RAN node 606 may broadcast the paging message during a paging occasion of the remote UE 602 (e.g., as determined from the I-RNTI included in the paging message).

At 620, the relay UE 604 may monitor for the paging message for the remote UE 602 during the paging occasion of the remote UE 602. The relay UE 604 may calculate the paging occasion based on, for example, the I-RNTI and RAN paging cycle of the remote UE 602 or the relay UE 604 may receive the paging occasion within the paging information provided by the remote UE 602. Upon receiving the paging message from the serving RAN node 606 within the paging occasion, at 622, the relay UE 604 may forward the paging message to the remote UE 602 via the relay link therebetween.

In some examples, the anchor RAN node 608 may be the serving RAN node 606. In this example, the anchor RAN node 608 may index on the I-RNTI of the remote UE in a cell ID table maintained by the anchor RAN node 608 of cells served by the anchor RAN node and broadcast the paging message within the within the cell including the relay UE 604.

In examples in which the anchor RAN node 608 further receives the S-TMSI of the remote UE 602, the anchor RAN node 608 may forward the S-TMSI of the remote UE to a core network node (e.g., an AMF). For example, the anchor RAN node may forward the S-TMSI of the remote UE 602 to the AMF to enable paging of the UE within the cell including the relay UE 604 (e.g., as shown in FIG. 5) when the RRC connection between the remote UE 602 and the core network is lost (e.g., due to re-boot of the anchor RAN node or other error condition).

Figure 7:
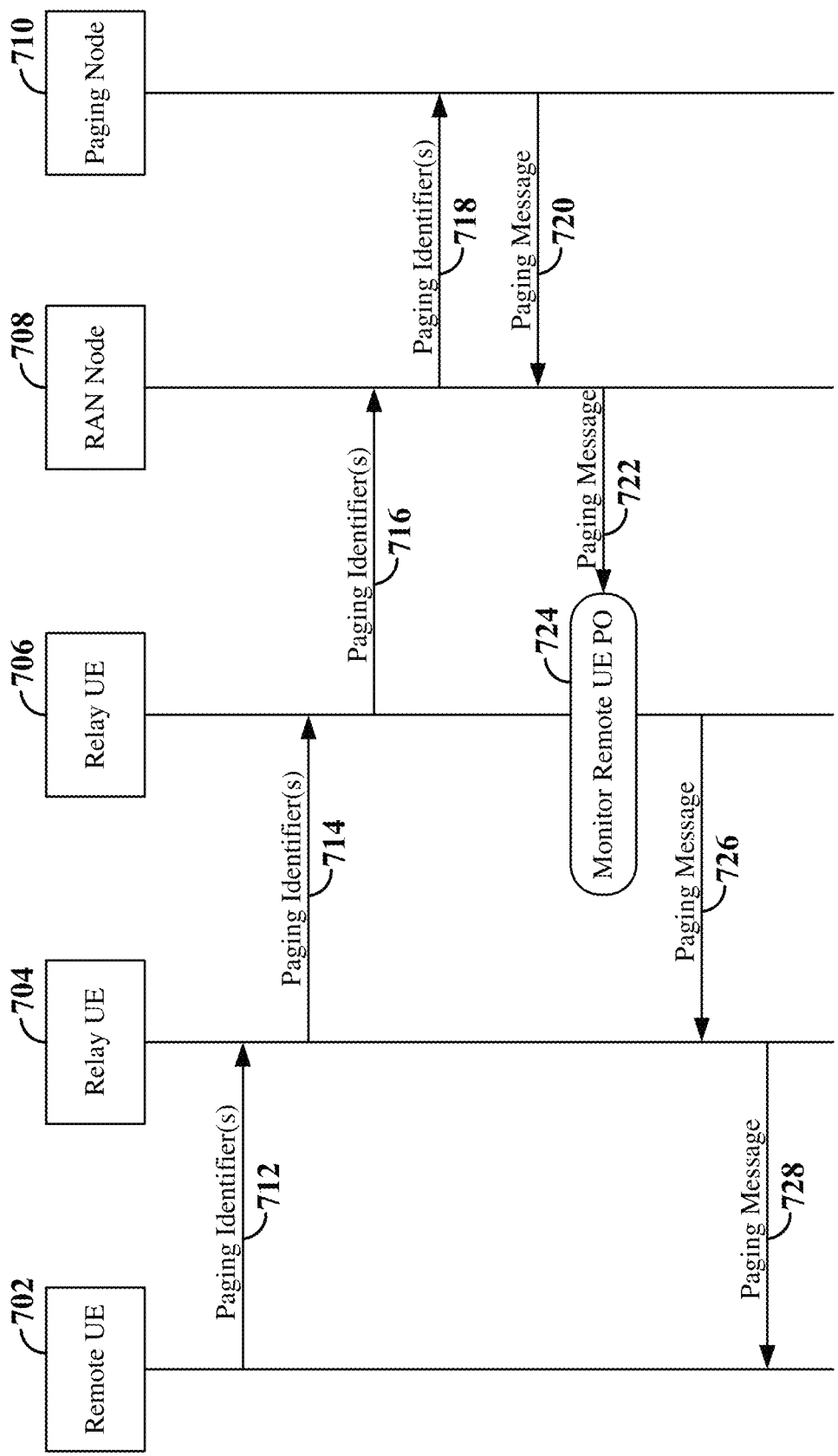
FIG. 7 is a signaling diagram illustrating an example of paging optimization for multi-hop relay operation according to some aspects.

FIG. 7 is a signaling diagram illustrating an example of paging optimization for multi-hop relay operation according to some aspects. FIG. 7 illustrates an example of paging of a remote UE 702 by a paging node 710 (e.g., an anchor RAN node or core network node) and relaying of the paging from a serving RAN node 708 to the remote UE 702 via a plurality of relay UEs (two of which 704 and 706 are shown for simplicity) when the remote UE is in an RRC inactive state or an RRC idle state. The serving RAN node 708 (and paging node 710 in examples in which the paging node 710 is an anchor RAN node) may each correspond to any of the base stations (e.g., gNBs) or scheduling entities illustrated in FIGS. 1, 3 and/or 4. In addition, each of the remote UE 702 and relay UEs 704 and 706 may correspond to any of the UEs or scheduled entities illustrated in FIGS. 1, 3, and/or 4. In examples in which the paging node 710 is a core network node, the paging node 710 may correspond, for example, to an AMF.

In the example shown in FIG. 7, the remote UE 702 and relay UE 704 may establish a relay link (sidelink) therebetween over a PC5 interface. In addition, the relay UE 704 and relay UE 706 may further establish a relay link (sidelink) therebetween over a PC5 interface. At 712, when the remote UE 702 enters an RRC inactive state or RRC idle state, the remote UE 702 may transmit paging identifier(s) identifying the remote UE 702 to the relay UE 704 over the corresponding relay link. For example, the paging identifier(s) may include the I-RNTI and/or S-TMSI. The paging identifier(s) may be transmitted, for example, within paging information that may further include the paging cycle or paging occasions of the remote UE 702. The paging information may be transmitted, for example, within a PC5 RRC message. For example, the PC5 RRC message may include a SidelinkUEInformationPC5 message.

At 714, the relay UE 704 may forward the paging identifier(s) of the remote UE 702 to the relay UE 706 over the corresponding relay link. The relay UE 704 may transmit the paging identifier(s) of the remote UE 702, along with the paging information of the remote UE 702, to the relay UE 706 within, for example, a PC5 RRC message. In some examples, both of the relay UEs 704 and 706 may have a respective Uu link with the serving RAN node 708 (e.g., each relay UE 704 and 706 may be attached to the serving RAN node 708). In other examples, the relay UE 704 may be in an RRC idle or RRC inactive state or may be outside the coverage area of the RAN node 708.

At 716, the relay UE 706 may forward the paging identifier(s) of the remote UE 702 to the serving RAN node 708 via, for example, a Uu link. In some examples, the serving RAN node 708 may store the paging identifier(s) of the remote UE 702 and associate the paging identifier(s) of the remote UE 702 with a serving cell of the relay UE 706 (e.g., the cell to which the relay UE 706 is attached). For example, the serving RAN node 708 may maintain a cell ID table of paging identifiers and corresponding cell identifiers (Cell IDs) for each of the paging identifiers. Here, the corresponding cell ID for each paging identifier is the cell ID of the relay UE 706 that forwarded the paging identifier.

At 718, the serving RAN node 708 may further forward the paging identifier(s) of the remote UE 702 to the paging node 710. In some examples, the paging node 710 may store the paging identifier(s) of the remote UE 702 and associate the paging identifier(s) of the remote UE 702 with the serving RAN node 708 of the relay UE 706. For example, the paging node 710 may maintain a RAN node table of paging identifiers and corresponding serving RAN nodes for each of the paging identifiers. Here, the corresponding serving RAN node for each paging identifier is the serving RAN node 708 of the relay UE 706 that forwarded the paging identifier to the serving RAN node 708.

The paging node 710 may then initiate paging of the remote UE 702 within the cell associated with the relay UE 706. For example, at 720, the paging node 710 may generate a paging message including the paging identifier of the remote UE 702 and transmit the paging message to the serving RAN node 708 of the relay UE 706 (e.g., based on the RAN node table). For example, the paging node 710 may index on the paging identifier of the remote UE 702 in the RAN node table to determine the serving RAN node 708 to which to send the paging message.

At 722, the serving RAN node 708 may then broadcast the paging message within the cell including the relay UE 706 (e.g., based on the paging identifier included in the paging message and the cell ID table). For example, the serving RAN node 708 may index on the paging identifier included the received paging message in the cell ID table to determine the cell ID of the cell within which to page the remote UE 702. The serving RAN node 708 may broadcast the paging message during a paging occasion of the remote UE 702 (e.g., as determined from the paging identifier included in the paging message).

At 724, the relay UE 706 may monitor for the paging message for the remote UE 702 during the paging occasion of the remote UE 702. The relay UE 706 may calculate the paging occasion based on, for example, the paging identifier and paging cycle of the remote UE 702 or the relay UE 704 may receive the paging occasion within the paging information provided by the remote UE 702. Upon receiving the paging message from the serving RAN node 708 within the paging occasion, at 726, the relay UE 704 may forward the paging message to the relay UE 704 via the relay link therebetween. Then, at 728, the relay UE 704 may forward the paging message to the remote UE 702 via the relay link therebetween.

Figure 8:
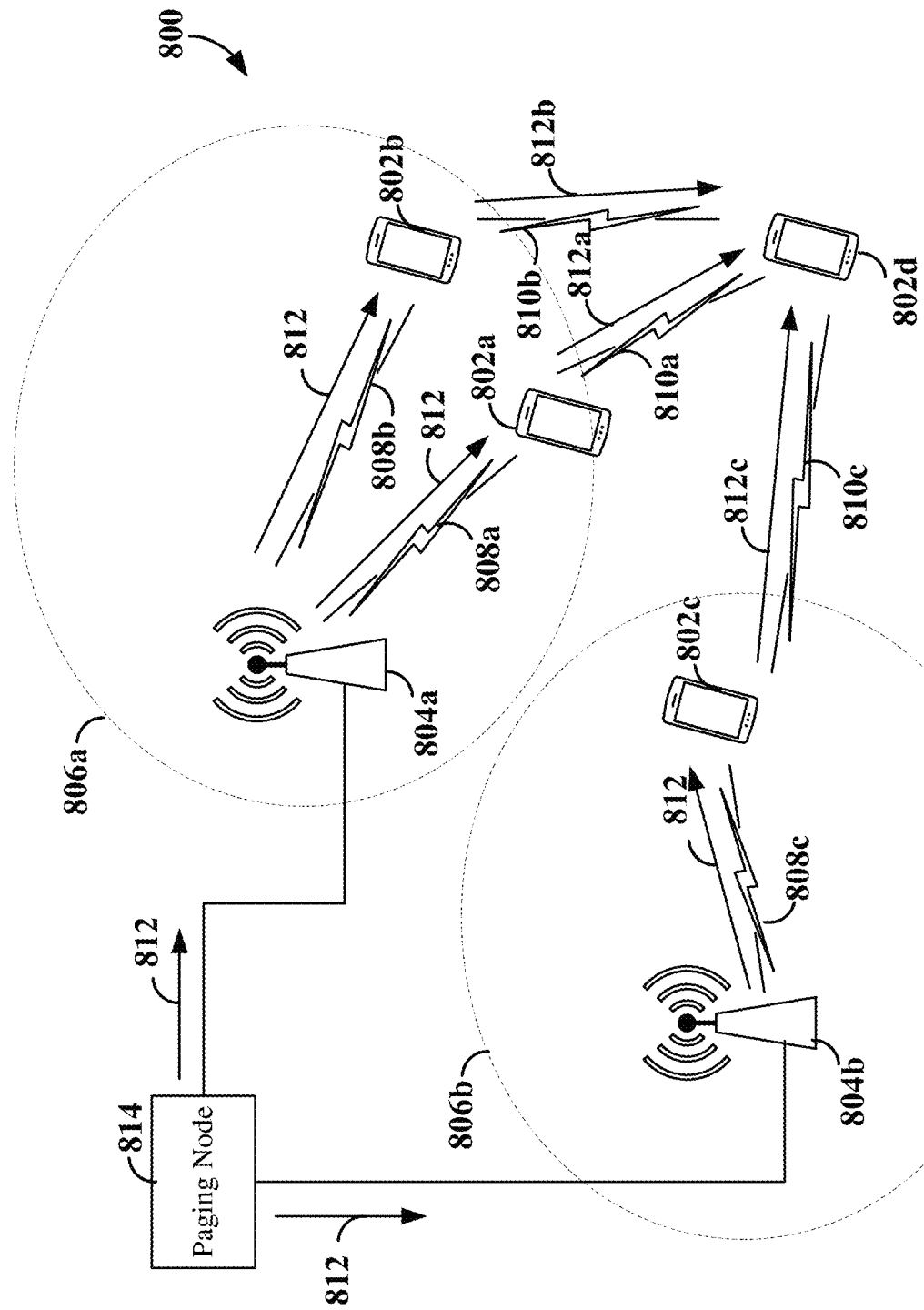
FIG. 8 is a diagram illustrating an example of paging optimization for multi-relay operation according to some aspects.

FIG. 8 is a diagram illustrating an example of paging optimization for multi-relay operation in a wireless network 800 according to some aspects. The wireless network 800 may correspond, for example, to the RAN 100 illustrated in FIG. 1 and/or the wireless network 300 shown in FIG. 3. The wireless network 800 may include RAN nodes 804*a* and 804*b* (e.g., base stations, such as gNBs) in wireless communication with one or more UEs 802*a*, 802*b*, and 802*c*. Each RAN node 804*a* and 804*b* may serve one or more cells 806*a* and 806*b*. In the example shown in FIG. 8, the RAN node 804*a* serves cell 806*a* including UEs 802*a* and 802*b* (e.g., UEs 802*a* and 802*b* are within the coverage area of cell 806*a*) and RAN node 804*b* serves cell 806*b* including UE 802*c* (e.g., UE 802*c* is within the coverage area of cell 806*b*). Thus, RAN node 804*a* may communicate with UEs 802*a* and 802*b* via a respective wireless communication link (e.g., a Uu link) 808*a* and 808*b*, and RAN node 804*b* may communicate with UE 802*c* via a wireless communication link (e.g., a Uu link) 808*c*.

In addition, one or more of the UEs 802*a*-802*c* may establish a relay link (sidelink) with a remote UE 802*d* to facilitate relaying of communication between the wireless network and the remote UE 802*d*. For example, when the remote UE 802*d* is in RRC connected mode, the remote UE 802*d* may establish a single relay link to relay information between the remote UE 802*d* and the wireless network. In various aspects, when the remote UE 802*d* is in an RRC idle or RRC inactive state, the remote UE 802*d* may establish multiple relay links to improve paging reliability. In the example shown in FIG. 8, the remote UE 802*d* may establish respective relay links 810*a*, 810*b*, and 810*c* with each of the UEs 802*a*, 802*b*, and 802*c*. Each relay link 810*a*, 810*b*, and 810*c* may be a sidelink that provides a PC5 path between the UE 802*a* and the corresponding UE 802*a*, 802*b*, and 802*c*. Each relay link 810*a*, 810*b*, and 810*c* enables communication between the respective RAN node 804*a* and 804*b* and the remote UE 802*d*.

In some aspects, when the remote UE 802*d* enters an RRC inactive state or RRC idle state, the remote UE 802*d* may transmit paging identifier(s) identifying the remote UE 802*d* to each relay UE 802*a*-802*c* over the corresponding relay link 810*a*-810*c*. For example, the paging identifier(s) may include the I-RNTI and/or S-TMSI. The paging identifier(s) may be transmitted, for example, within paging information that may further include the paging cycle or paging occasions of the remote UE 802*d*. The paging information may be transmitted, for example, within a PC5 RRC message. For example, the PC5 RRC message may include a SidelinkUEInformationPC5 message.

Each relay UE 802*a*-802*c* may then forward the paging identifier(s) of the remote UE 802*d* to the respective RAN node 804*a* and 804*b*. For example, relay UEs 802*a* and 802*b* may each forward the paging identifier(s) of the remote UE 802*d* to the RAN node 804*a* and relay UE 802*c* may forward the paging identifier(s) of the remote UE 802*d* to the RAN node 804*b*. Each RAN node 804*a* and 804*b* may then forward the paging identifier(s) of the remote UE 802*d* to a paging node 814. The paging node 814 may be, for example, an anchor RAN node or core network node (e.g., an AMF).

The paging node 814 may then initiate paging of the remote UE 802*d* within the cells 806*a* and 806*b* including the relay UEs 802*a*-802*c*. For example, the paging node 814 may generate a paging message 812 including a paging identifier of the remote UE 802*d*. The paging node 814 may then transmit the paging message 812 to each of the RAN nodes 804*a* and 804*b* based on an association between the paging identifier of the remote UE 802*d* and each of the RAN nodes 804*a* and 804*b* (e.g., due to the receipt of the paging identifier(s) of the remote UE 802*d* from the RAN nodes 804*a* and 804*b*). The association between the paging identifier of the remote UE 802*d* and the RAN nodes 804*a* and 804*b* may be, for example, a RAN node table including paging identifiers and corresponding respective RAN node(s) maintained within the paging node 814.

Each RAN node 804*a* and 804*b* may then broadcast the paging message 812 within the cells 806*a* and 806*b* including the relay UEs 802*a*-802*c*. In examples in which the RAN nodes 804*a* and 804*b* each serve more than one cell, each RAN node 804*a* and 804*b* may identify the cells 806*a* and 806*b* within which to broadcast the paging message 812 based on an association between the paging identifier of the remote UE 802*d* and the cell IDs of each of the cells 806*a* and 806*b* (e.g., due to the receipt of the paging identifier(s) of the remote UE 802*d* from the relay UEs 802*a*, 802*b*, and 802*c*). The association between the paging identifier of the remote UE 802*d* and the cells 806*a* and 806*b* may be, for example, a cell ID table including paging identifiers and corresponding respective cell IDs maintained within the RAN nodes 804*a* and 804*b*.

Each relay UE 802*a*-802*c* may then forward the paging message (e.g., a respective instance of the paging message 812*a*-812*c*) to the remote UE 802*d* via the respective relay links 810*a*-810*c*. In some examples, the remote UE 802*d* may select one of the paging message instances (e.g., paging message instance 812*a*) for receipt and decoding thereof. In some examples, the remote UE 802*d* may select the paging message instance 812*a* based on a respective channel quality (e.g., signal-to-interference-plus-noise ratio (SINR), reference signal received power (RSRP), reference signal received quality (RSRQ), or other suitable measure of channel quality) of each of the relay links 810*a*-810*c*. For example, relay link 810*a* may provide the best channel quality (e.g., highest SINR, RSRP, or RSRQ). In this example, the remote UE 802*d* may then respond to the paging message 812*a* via the relay UE 802*a* over relay link 810*a*. For example, the remote UE 802*d* may perform an RRC Resume procedure (e.g., for an inactive remote UE 802*d*) or RRC connection establishment procedure (e.g., for an idle remote UE 802*d*) with the RAN node 804*a* via the relay UE 802*a* to transition to an RRC connected state.

In some examples, the remote UE 802*d* may receive each of the paging message instances 812*a*-812*c* from each of the relay UEs 802*a*-802*c* to produce a combined paging message for improved decoding thereof. In this example, the remote UE 802*d* may select one of the relay UEs 802*a*-802*c* through which to respond to the paging message 812.

Figure 9:
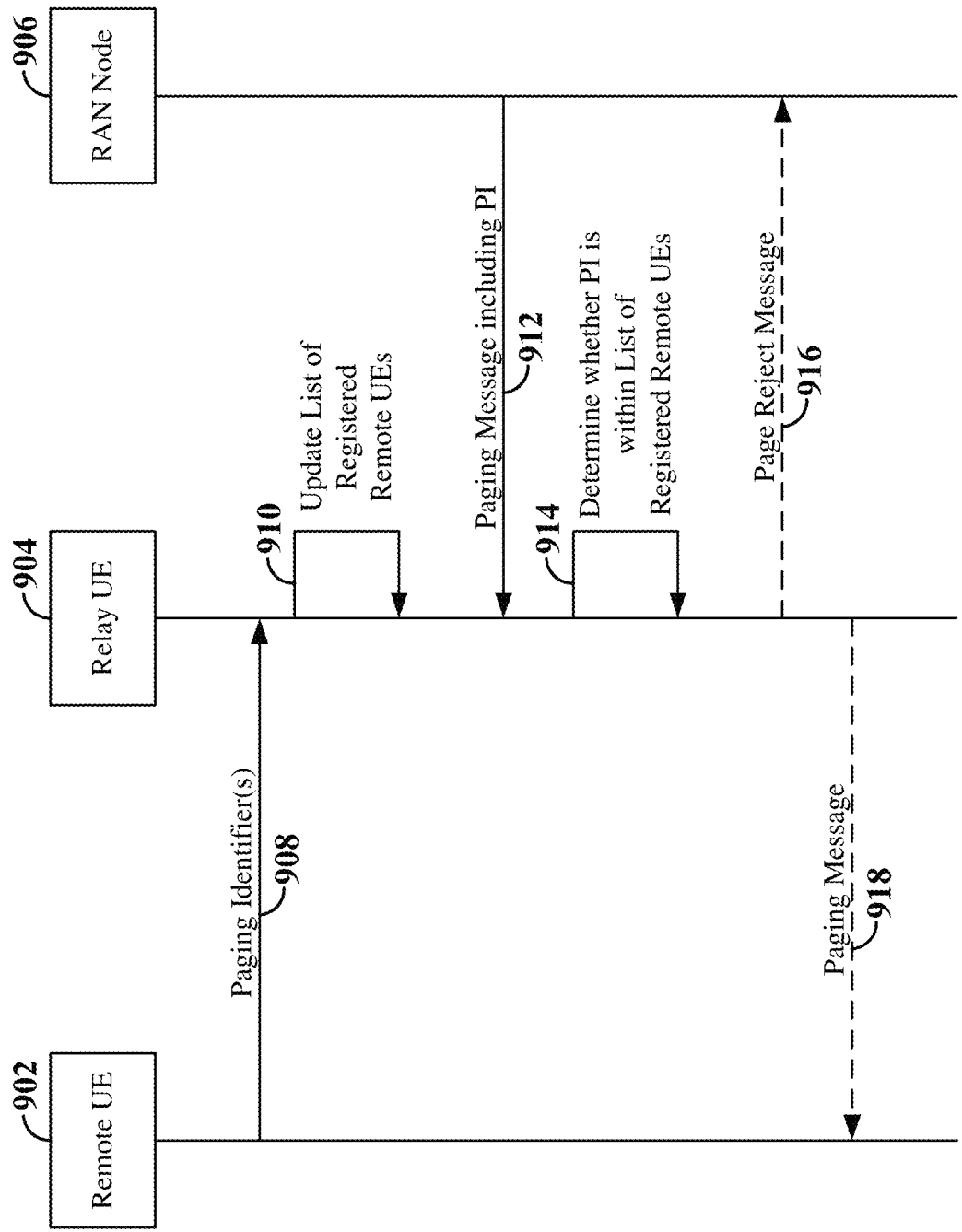
FIG. 9 is a signaling diagram illustrating another example of paging optimization for relay operation according to some aspects.

FIG. 9 is a signaling diagram illustrating another example of paging optimization for relay operation according to some aspects. In the example shown in FIG. 9, a relay UE 904 provides for relaying of communication between a remote UE 902 and a RAN node 906. The RAN node 906 may correspond to any of the base stations (e.g., gNBs) or scheduling entities illustrated in FIGS. 1, 3 and/or 4. In addition, each of the remote UE 902 and relay UE 904 may correspond to any of the UEs or scheduled entities illustrated in FIGS. 1, 3, and/or 4.

In the example shown in FIG. 9, the remote UE 902 and relay UE 904 may establish a relay link (sidelink) therebetween over a PC5 interface. At 908, when the remote UE 902 enters an RRC inactive state or RRC idle state, the remote UE 902 may transmit paging identifier(s) identifying the remote UE 902 to the relay UE 904 over the corresponding relay link. For example, the paging identifier(s) may include the I-RNTI and/or S-TMSI. The paging identifier(s) may be transmitted, for example, within paging information that may further include the paging cycle or paging occasions of the remote UE 902. The paging information may be transmitted, for example, within a PC5 RRC message. For example, the PC5 RRC message may include a SidelinkUE-InformationPC5 message.

At 910, the relay UE 904 may update a list of registered remote UEs maintained in the relay UE 904 with the paging identifier(s) of the remote UE 902. The list of registered remote UEs may include, for example, the paging identifier(s) of each of the remote UEs with which the relay UE 904 has a relay link.

At 912, the RAN node 906 may broadcast a paging message including a paging identifier (PI) within a cell including the relay UE 904. At 914, the relay UE 904 may determine whether the PI associated with the received paging message is within the list of registered remote UEs. For example, the relay UE 904 may compare the PI in the received paging message with the paging identifiers of the registered remote UEs in the list to determine whether the paging message is intended for a remote UE registered with the relay UE 904 for relay communication.

At 916, the relay UE 904 may optionally transmit a page reject message to the RAN node 906. For example, the relay UE 904 may transmit the page reject message when the PI in the received paging message does not match any of the paging identifiers included in the list of registered remote UEs. Upon receiving the page reject message, the network may either expand paging to include the registration area or RNA or may remove the association between the PI included in the paging message and the cell including the relay UE 904 when more than one cell is associated with the PI. In addition, the relay UE may not forward the paging message to any remote UEs.

At 918, the relay UE 904 may optionally forward the paging message to the remote UE 902. For example, the relay UE 904 may forward the paging message to the remote UE 902 when the PI in the received paging message matches a paging identifier included in the list of registered remote UEs (e.g., the PI included in the received paging message matches the paging identifier of the remote UE 902).

Figure 10:
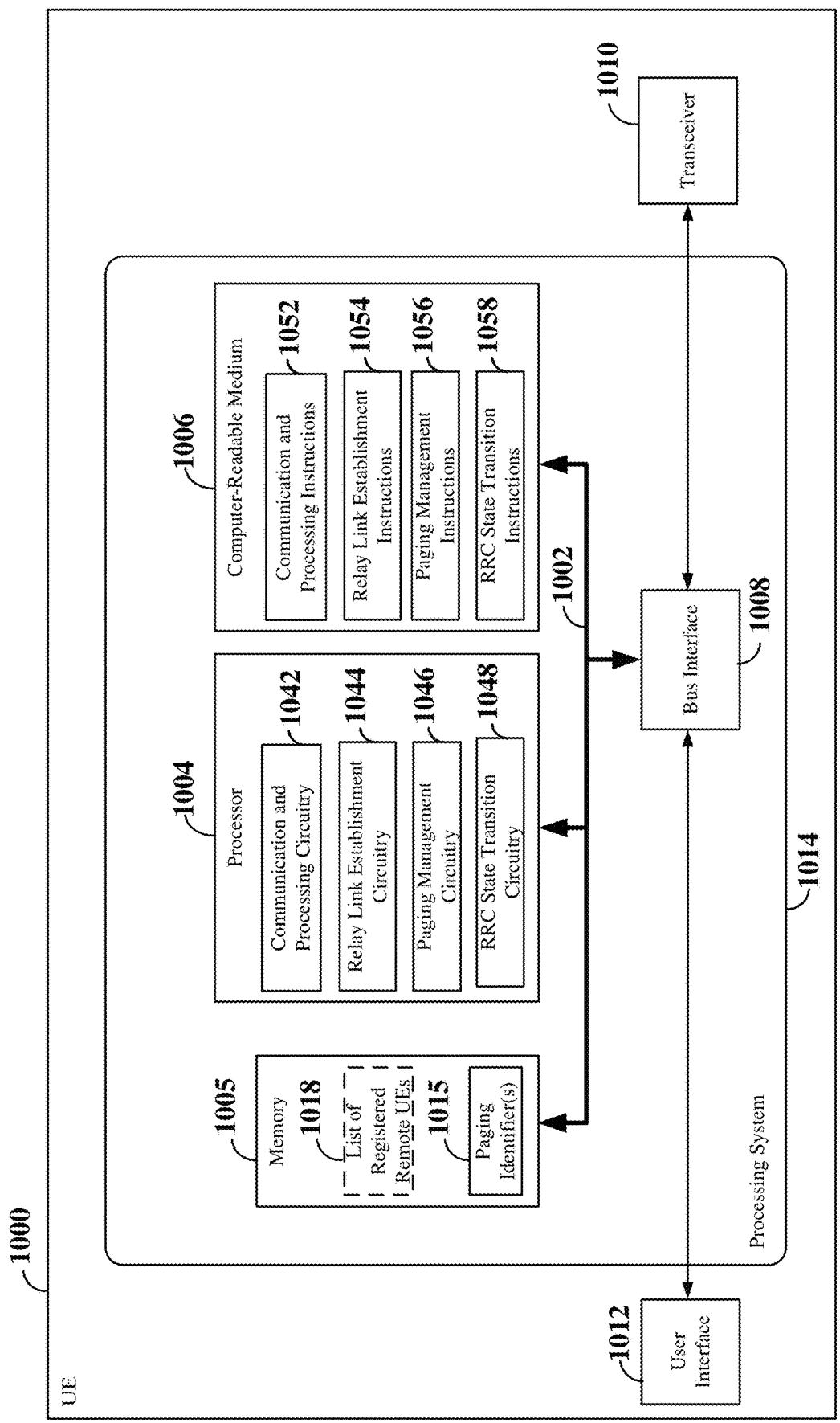
FIG. 10 is a block diagram illustrating an example of a hardware implementation for a UE employing a processing system according to some aspects.

FIG. 10 is a conceptual diagram illustrating an example of a hardware implementation for an exemplary user equipment (UE) 1000 employing a processing system 1014. For example, the UE 1000 may be a UE or scheduled entity as illustrated in any one or more of FIG. 1, and/or 3-9.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes described below. The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. In some examples, the computer-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042 configured to communicate with a radio access network (RAN) node (e.g., a base station, such as a gNB). The communication and processing circuitry 1042 may further be configured to communicate with another UE via a relay link (sidelnk). In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission).

In examples in which the UE 1000 is a remote UE, the communication and processing circuitry 1042 may be configured to transmit paging identifier(s) 1015 of the remote UE to a relay UE via the transceiver 1010 over a relay link therebetween. The paging identifier(s) 1015 may be stored, for example, in memory 1005, and may include, for example, the S-TMSI and/or the I-RNTI of the remote UE. The communication and processing circuitry 1042 may further be configured to receive a CN-initiated or RAN-initiated paging message for the remote UE from the relay UE. In some examples, the communication and processing circuitry 1042 may be configured to transmit the paging identifier(s) of the remote UE to a plurality of relay UEs (e.g., two or more relay UEs) via the transceiver 1010 over respective relay links therebetween. In this example, the communication and processing circuitry 1042 may further be configured to receive a respective instance of a paging message for the remote UE from each of the plurality of relay UEs.

In examples in which the UE 1000 is a relay UE, the communication and processing circuitry 1042 may be configured to receive the paging identifier(s) of a remote UE via the transceiver 1010 over a relay link therebetween. The paging identifier(s) may be received within, for example, paging information that may further include the paging cycle and/or paging occasions of the remote UE. In this example, the communication and processing circuitry 1042 may further be configured to store the paging identifier(s) of the remote UE within a list of registered remote UEs 1018. The list of registered remote UEs 1018 may be stored, for example, in memory 1005. The list of registered remote UEs indicates all of the remote UEs with which the relay UE has a relay link for relaying communication. The communication and processing circuitry 1042 may further be configured to forward the paging identifier(s) of the remote UE to a RAN node serving a cell within which the relay UE is located via the transceiver 1010 and a Uu link therebetween. The communication and processing circuitry 1042 may further be configured to receive a CN-initiated or RAN-initiated paging message for a remote UE from the RAN node. The communication and processing circuitry 1042 may further be configured to forward the paging message to the remote UE when the remote UE is within the list of registered remote UEs 1018. The communication and processing circuitry 1042 may further be configured to transmit a page reject message to the RAN node when the remote UE is not within the list of registered remote UEs 1018. The communication and processing circuitry 1042 may further be configured to execute communication and processing instructions (software) 1052 stored in the computer-readable medium 1006 to implement one or more of the functions described herein.

The processor 1004 may further include relay link establishment circuitry 1044, configured to establish a relay link with another UE. For example, the relay link establishment circuitry 1044 may be configured to generate and transmit discovery signals to one or more remote UEs to initiate establishment of a relay link (sidelink) therebetween. The relay link establishment circuitry 1044 may further be configured to receive one or more discovery signals from potential relay UEs and to utilize the received discovery signal(s) to select one or more relay UEs for relaying of communication between the remote UE and the RAN node. For example, the relay link establishment circuitry 1044 may be configured to perform a random access procedure with the selected relay UE(s) to establish a respective relay link (sidelink) therebetween. The relay link establishment circuitry 1044 may further be configured to execute relay link establishment instructions (software) 1054 stored in the computer-readable medium 1006 to implement one or more of the functions described herein.

The processor 1004 may further include paging management circuitry 1046, configured to optimize paging for L2 relay operation. In examples in which the UE 1000 is a remote UE, the paging management circuitry 1046 may be configured to receive a paging message from a relay UE via the communication and processing circuitry 1042 and transceiver 1010 and to generate a response to the paging message for transmission via the relay UE.

The paging management circuitry 1046 may further be configured to receive at least one instance of the paging message from at least one relay UE of a plurality of relay UEs in wireless communication with the remote UE via respective relay links. In some examples, the paging management circuitry 1046 may be configured to select one of the paging message instances for receipt and decoding thereof. The paging management circuitry 1046 may select the paging message instance based on the respective channel quality of each of the relay links. For example, the paging management circuitry 1046 may measure the SINR, RSRP, RSRQ or other suitable channel quality parameter of each of the relay links and select the paging message instance transmitted on the relay link having the best (highest) channel quality. In this example, the paging management circuitry 1046 may respond to the paging message over the selected relay link (e.g., via the relay UE associated with the selected relay link). In other examples, the paging management circuitry may be configured to receive each of the plurality of paging message instances for receipt thereof to produce a combined paging message for improved decoding. In this example, the paging management circuitry 1046 may be configured to select one of the relay UEs through which to respond to the paging message using any suitable selection mechanism.

In examples in which the UE 1000 is a relay UE, the paging management circuitry 1046 may be configured to receive the paging identifier(s) identifying a remote UE over a relay link therebetween via the communication and processing circuitry 1042 and the transceiver 1010. The paging management circuitry 1046 may further be configured to operate together with the communication and processing circuitry 1042 to forward the paging identifier(s) of the remote UE to the RAN node.

The paging management circuitry 1046 may further be configured to receive a CN-initiated paging message or RAN-initiated paging message for the remote UE from the RAN node. In some examples, the paging management circuitry 1046 is configured to forward the CN-initiated paging message or RAN-initiated paging message to the remote UE over the relay link via the communication and processing circuitry 1042 and transceiver 1010. For example, the paging management circuitry 1046 may compare a paging identifier included in the paging message with the list of registered remote UEs 1018, and forward the paging message to the remote UE when the paging identifier of the remote UE is included in the list of registered remote UEs 1018. In some examples, the paging management circuitry 1046 is configured to transmit a page reject message to the RAN node via the communication and processing circuitry 1042 and the transceiver 1010. For example, the paging management circuitry 1046 may generate and transmit the page reject message when the paging identifier included in the paging message is not within the list of registered remote UEs 1018. The paging management circuitry 1046 may further be configured to execute paging management instructions 1056 stored in the computer-readable medium 1006 to implement one or more of the functions described herein.

The processor 1004 may further include RRC state transition circuitry 1048, configured to transition the UE 1000 between an RRC connected state, an RRC idle state, and an RRC inactive state. For example, the RRC state transition circuitry 1048 may transition the UE from an RRC connected state to either an RRC idle state or an RRC inactive state. Upon entering the RRC idle state or RRC inactive state, the RRC state transition circuitry 1048 may further operate together with the paging management circuitry 1046 and communication and processing circuitry 1042 to transmit the paging identifier(s) of the UE 1000 to a relay UE. The RRC state transition circuitry 1048 may further operate together with the paging management circuitry 1046 and communication and processing circuitry 1042 to perform an RRC Resume or RRC Connection Establishment procedure with a RAN node via the relay UE in response to receiving the paging message.

Figure 11:
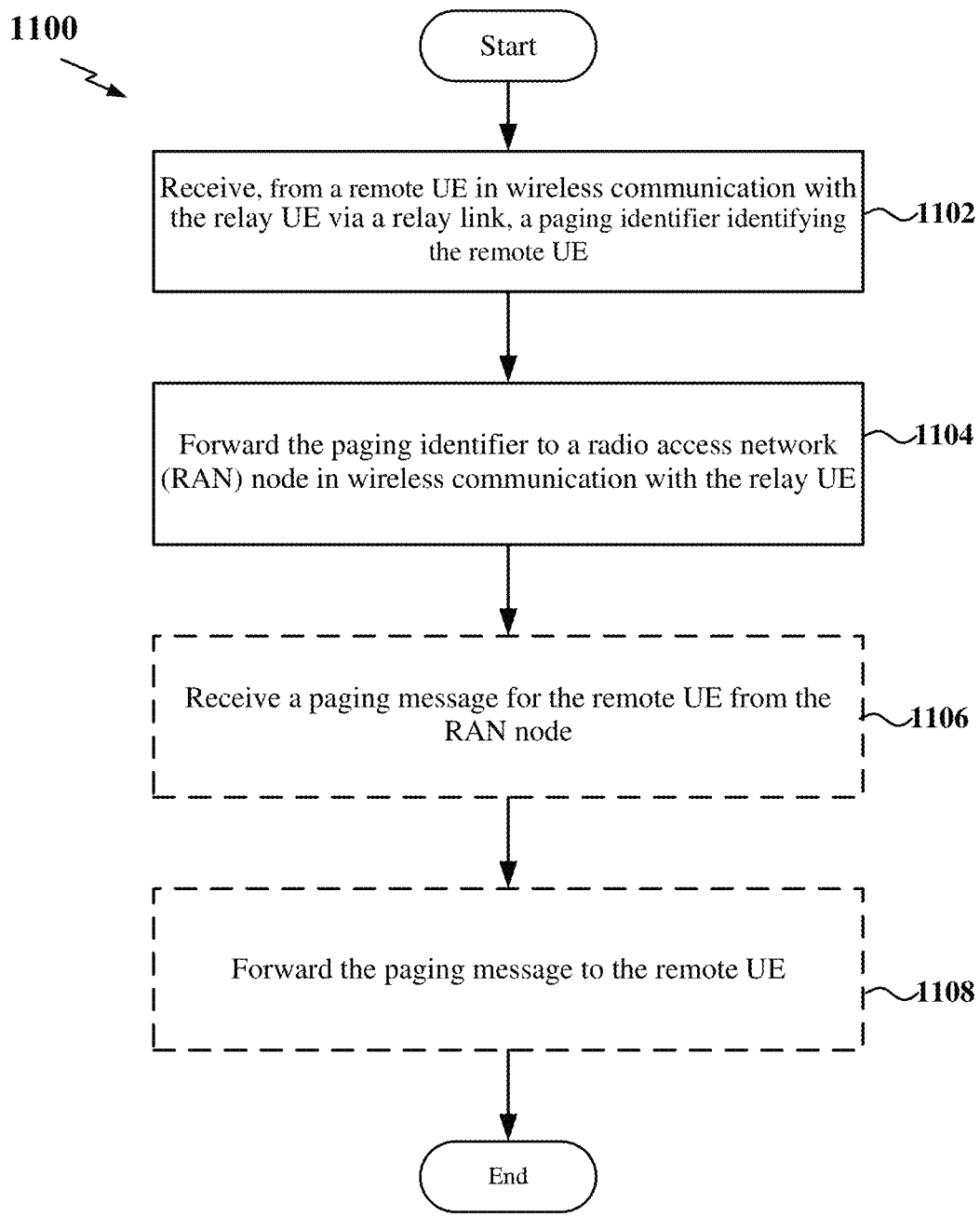
FIG. 11 is a flow chart of an exemplary process for paging optimization at a relay UE according to some aspects.

FIG. 11 is a flow chart illustrating an exemplary process 1100 for paging optimization at a relay UE according to some aspects. As described below, some or all illustrated features may be omitted in a particular implementation within the scope of the present disclosure, and some illustrated features may not be required for implementation of all embodiments. In some examples, the process 1100 may be carried out by the UE 1000 illustrated in FIG. 10. In some examples, the process 1100 may be carried out by any suitable apparatus or means for carrying out the functions or algorithm described below.

At block 1102, the relay UE may receive, from a remote UE in wireless communication with the relay UE via a relay link, a paging identifier identifying the remote UE. In some examples, the paging identifier may include an S-TMSI. In some examples, the paging identifier may include an I-RNTI. In some examples, the paging identifier may include both the S-TMSI and the R-INTI. In some examples, the paging identifier may be included within paging information that may further include the paging cycle and/or paging occasions of the remote UE. For example, the paging management circuitry 1046, together with the communication and processing circuitry 1042 and transceiver 1010, shown and described above in connection with FIG. 10 may provide a means for receiving the paging identifier from the remote UE.

At block 1104, the relay UE may forward the paging identifier to a radio access network (RAN) node in wireless communication with the relay UE. In some examples, the relay UE may forward the paging identifier to another relay UE for forwarding of the paging identifier to the RAN node in a multi-hop relay configuration. For example, the paging management circuitry 1046, together with the communication and processing circuitry 1042 and transceiver 1010, shown and described above in connection with FIG. 10 may provide a means for forwarding the paging identifier to the RAN node.

At block 1106, the relay UE may optionally receive a paging message for the remote UE from the RAN node. In some examples, the paging message may be a core network (CN)-initiated paging message when the remote UE is in an idle state. In other examples, the paging message may be a RAN-initiated paging message when the remote UE is in an inactive state. The paging message may further include the paging identifier of the remote UE. For example, the paging identifier may include the S-TMSI when the UE is in an idle state or the I-RNTI when the UE is in an inactive state. For example, the paging management circuitry 1046, together with the communication and processing circuitry 1042 and transceiver 1010, shown and described above in connection with FIG. 10 may provide a means for receiving a paging message for the remote UE.

At block 1108, the relay UE may optionally forward the paging message to the remote UE. In some examples, the relay UE may maintain a list of registered remote UEs, each registered with the relay UE for relaying communication between the respective remote UE and the RAN node via a respective relay link. In some examples, the relay UE may receive a paging message from the RAN node for an additional remote UE including an additional paging identifier of the additional remote UE. The relay UE may further transmit a page reject message to the RAN node to reject the paging message when the list of registered remote UEs does not include the additional paging identifier of the additional remote UE. For example, the paging management circuitry 1046, together with the communication and processing circuitry 1042 and transceiver 1010, shown and described above in connection with FIG. 10 may provide a means for forwarding the paging message to the remote UE.

Figure 12:
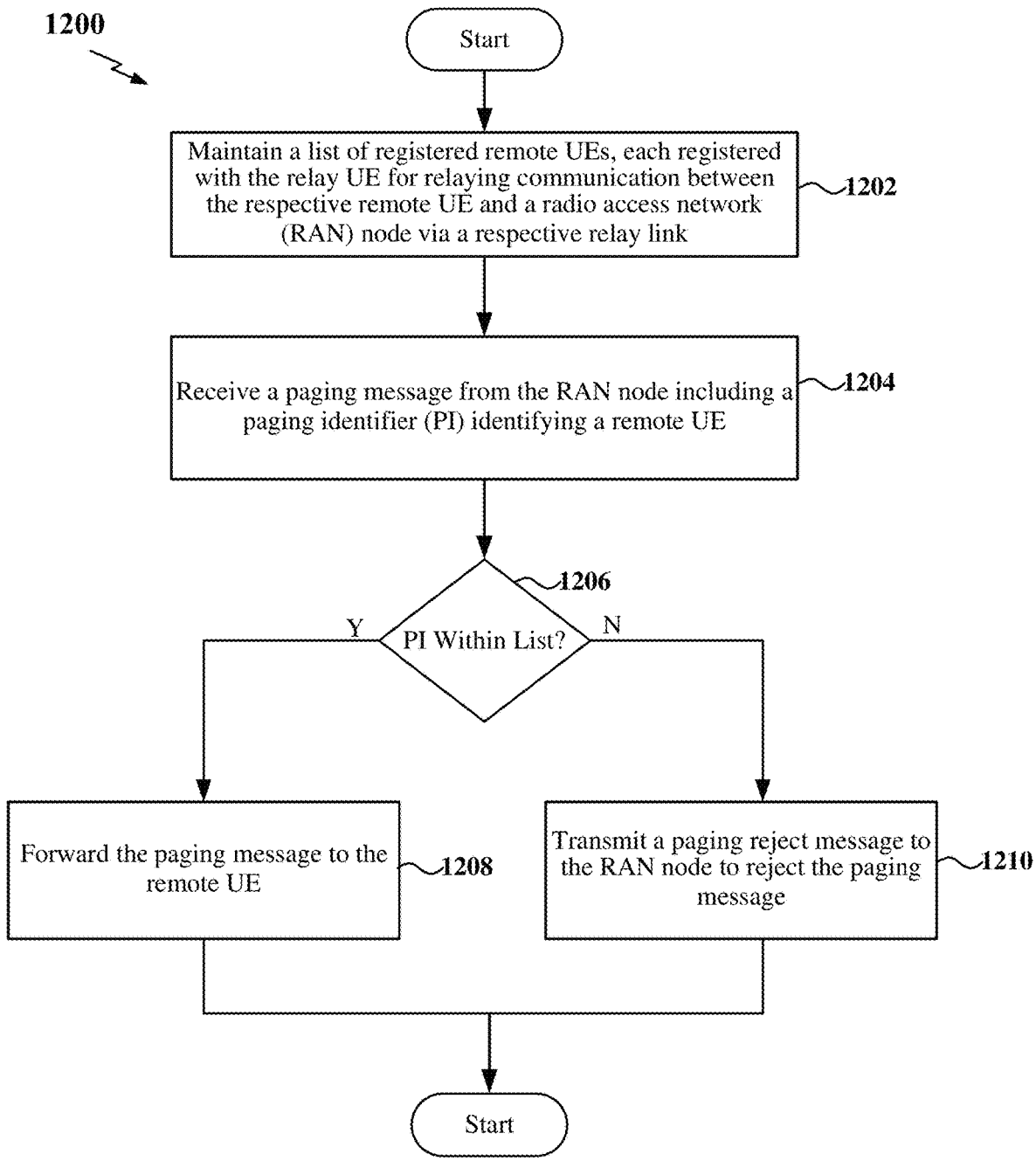
FIG. 12 is a flow chart of another exemplary process for paging optimization at a UE according to some aspects.

FIG. 12 is a flow chart illustrating an exemplary process 1200 for paging optimization at a relay UE according to some aspects. As described below, some or all illustrated features may be omitted in a particular implementation within the scope of the present disclosure, and some illustrated features may not be required for implementation of all embodiments. In some examples, the process 1200 may be carried out by the UE 1000 illustrated in FIG. 10. In some examples, the process 1200 may be carried out by any suitable apparatus or means for carrying out the functions or algorithm described below.

At block 1202, the relay UE may maintain a list of registered remote UEs, each registered with the relay UE for relaying communication between the respective remote UE and a radio access network (RAN) node via a respective relay link. The list of registered remote UEs may include, for example, at least one respective paging identifier for each of the registered remote UEs. For example, the at least one respective paging identifier may include at least one of an S-TMSI or I-RNTI. In some examples, the relay UE may further receive the at least one paging identifier from each of the registered remote UEs and forward the at least one paging identifier for each of the registered remote UEs to the RAN node. For example, the paging management circuitry 1046 shown and described above in connection with FIG. 10 may provide a means to maintain the list of registered remote UEs.

At block 1204, the relay UE may receive a paging message from the RAN node including a paging identifier (PI) identifying a remote UE. In some examples, the paging message may be a CN-initiated paging message when the remote UE is in an idle state. In other examples, the paging message may be a RAN-initiated paging message when the remote UE is in an inactive state. For example, the paging management circuitry 1046, together with the communication and processing circuitry 1042 and transceiver 1010, shown and described above in connection with FIG. 10 may provide a means for receiving the paging message for the remote UE.

At block 1206, the relay UE may determine whether the PI included in the paging message is within the list of registered remote UEs. For example, the paging management circuitry 1046 shown and described above in connection with FIG. 10 may provide a means for determining whether the PI is within the list of registered remote UEs.

If the PI is within the list of registered remote UEs (Y branch of block 1206), at block 1208, the relay UE may forward the paging message to the remote UE. If the PI is not within the list of registered remote UEs (N branch of block 1206), at block 1210, the relay UE may transmit a page reject message to the RAN node to reject the paging message. For example, the paging management circuitry 1046, together with the communication and processing circuitry 1042 and transceiver 1010, shown and described above in connection with FIG. 10 may provide a means for forwarding the paging message and a means for transmitting the page reject message.

Figure 13:
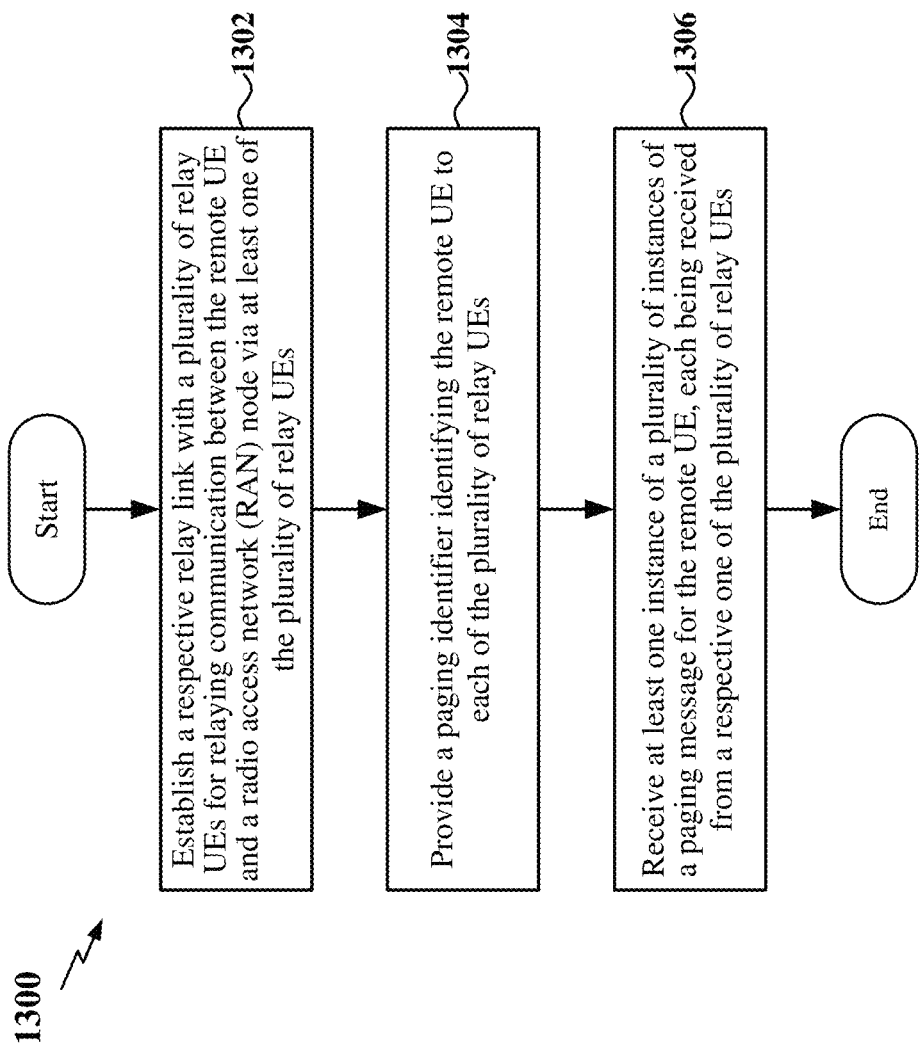
FIG. 13 is a flow chart of an exemplary process for paging optimization at a remote UE according to some aspects.

FIG. 13 is a flow chart illustrating an exemplary process 1300 for paging optimization at a remote UE according to some aspects. As described below, some or all illustrated features may be omitted in a particular implementation within the scope of the present disclosure, and some illustrated features may not be required for implementation of all embodiments. In some examples, the process 1300 may be carried out by the UE 1000 illustrated in FIG. 10. In some examples, the process 1300 may be carried out by any suitable apparatus or means for carrying out the functions or algorithm described below.

At block 1302, the remote UE may establish a respective relay link with a plurality of relay UEs for relaying communication between the remote UE and a radio access network (RAN) node via at least one of the plurality of relay UEs. For example, the relay link establishment circuitry 1044 shown and described above in connection with FIG. 10 may provide a means for establishing the respective relay links.

At block 1304, the remote UE may provide a paging identifier identifying the remote UE to each of the plurality of relay UEs. In some examples, the paging identifier may include the S-TMSI and/or I-RNTI. For example, the paging management circuitry 1046, together with the communication and processing circuitry 1042 and transceiver 1010, shown and described above in connection with FIG. 10 may provide a means for providing the paging identifier identifying the remote UE to each of the plurality of relay UEs.

At block 1306, the remote UE may receive at least one instance of a plurality of instances of a paging message for the remote UE, each being received from a respective one of the plurality of relay UEs. In some examples, the remote UE may select a first instance of the plurality of instances of the paging message for receipt thereof. The first instance may be received from a first relay UE of the plurality of UEs. For example, the remote UE may select the first instance based on a respective channel quality of each of the respective relay links. In this example, the remote UE may further respond to the paging message via the first relay UE. In some examples, the remote UE may receive each of the plurality of instances of the paging message to produce a combined paging message. For example, the paging management circuitry 1046, together with the communication and processing circuitry 1042 and transceiver 1010, shown and described above in connection with FIG. 10 may provide a means for receiving at least one instance of the paging message.

In one configuration, the UE 1000 includes various means as described in the present disclosure. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable medium 1006, or any other suitable apparatus or means described in any one of the FIGS. 1, 2, and/or 3-9, and utilizing, for example, the processes and/or algorithms described herein in relation to FIGS. 11-13.

Figure 14:
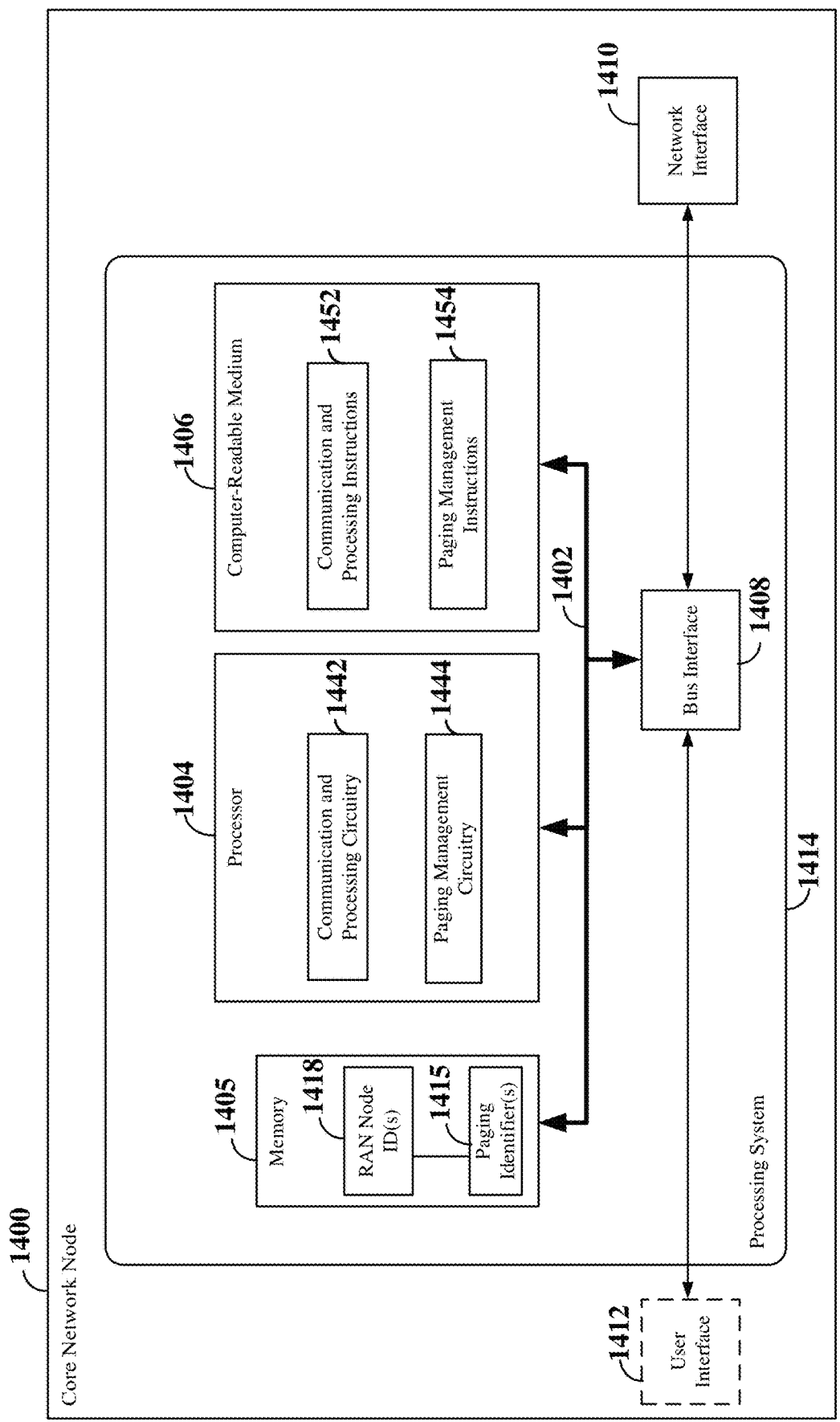
FIG. 14 is a block diagram illustrating an example of a hardware implementation for a core network node employing a processing system according to some aspects.

FIG. 14 is a conceptual diagram illustrating an example of a hardware implementation for an exemplary core network node 1400 employing a processing system 1414. For example, the core network node 1400 may correspond to an access management function (AMF) functioning as a paging node as shown in any one or more of FIG. 5, 7, or 8.

In accordance with various aspects of the disclosure, an element, or any portion of an element, or any combination of elements may be implemented with a processing system 1414 that includes one or more processors 1404. The processing system 1414 may be substantially the same as the processing system 1014 illustrated in FIG. 10, including a bus interface 1408, a bus 1402, memory 1405, a processor 1404, and a computer-readable medium 1406. Furthermore, the core network node 1400 may include an optional user interface 1412 and a network interface 1410. The processor 1404, as utilized in a core network node 1400, may be used to implement any one or more of the processes described below.

The processor 1404 may include communication and processing circuitry 1442, configured to communicate with one or more radio access network (RAN) nodes (e.g., base stations, such as gNBs) within a RAN. In some examples, the communication and processing circuitry 1442 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1442 may be configured to receive a paging identifier (e.g., an S-TMSI) of a remote user equipment (UE) in wireless communication with one or more relay UEs from one or more of the RAN nodes serving the one or more relay UEs via the network interface 1410. The communication and processing circuitry 1442 may further be configured to store the paging identifier 1415, together with a respective RAN identifier (ID) 1418 of each RAN node that provided the paging identifier of the remote UE within, for example, the memory 1405. The paging identifier(s) 1415 and associated RAN ID(s) 1418 may be maintained, for example, as a RAN node table within the memory 1405. The communication and processing circuitry 1442 may further be configured to transmit a paging message for a remote UE to the RAN node(s) associated with the paging identifier of the remote UE via the network interface 1410. The communication and processing circuitry 1442 may further be configured to execute communication and processing instructions (software) 1452 stored in the computer-readable medium 1406 to implement one or more of the functions described herein.

The processor 1404 may further include paging management circuitry 1444, configured to optimize paging of a remote UE. For example, upon detecting the need to page a remote UE, the paging management circuitry 1444 may be configured to generate a paging message for the remote UE and include the paging identifier (e.g., S-TMSI) of the remote UE in the paging message. The paging management circuitry 1444 may further be configured to transmit the paging message for the remote UE to the RAN node(s) having RAN node IDs 1418 associated with the paging identifier 1415 of the remote UE. In this way, the paging management circuitry 1444 may page the remote UE within only the cell(s) including the relay UE(s) of the remote UE. The paging management circuitry 1444 may further be configured to execute paging management instructions (software) 1454 stored in the computer-readable medium 1406 to implement one or more of the functions described herein.

Figure 15:
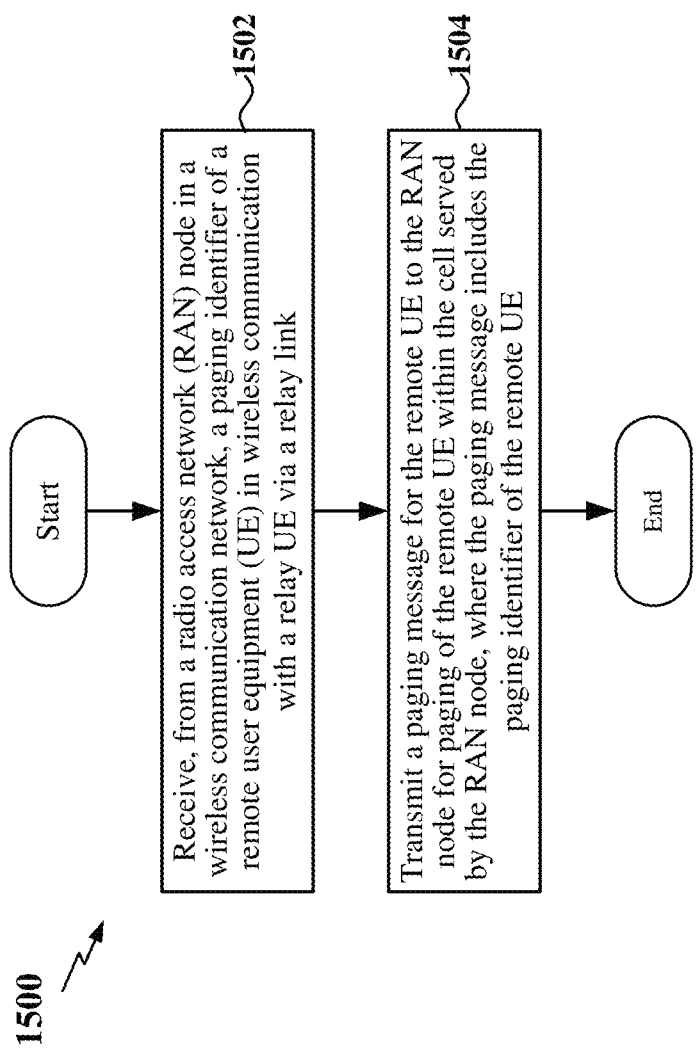
FIG. 15 is a flow chart of an exemplary process for paging optimization at a core network node according to some aspects.

FIG. 15 is a flow chart of an exemplary process 1500 for paging optimization at a core network node according to some aspects. As described below, some or all illustrated features may be omitted in a particular implementation within the scope of the present disclosure, and some illustrated features may not be required for implementation of all embodiments. In some examples, the process 1500 may be carried out by the core network node 1400 illustrated in FIG. 14. In some examples, the process 1500 may be carried out by any suitable apparatus or means for carrying out the functions or algorithm described below.

At block 1502, the core network node may receive, from a radio access network (RAN) node in a wireless communication network, a paging identifier of a remote user equipment (UE) in wireless communication with a relay UE via a relay link. The RAN node serves a cell including the relay UE. In some examples, the core network node may receive the paging identifier of the remote UE from a plurality of (e.g., two or more) RAN nodes. For example, the paging management circuitry 1444, together with the communication and processing circuitry 1442 and transceiver 1410, shown and described above in connection with FIG. 14 may provide a means for receiving the paging identifier of the remote UE.

At block 1504, the core network node may transmit a paging message for the remote UE to the RAN node for paging of the remote UE within the cell served by the RAN node, where the paging message includes the paging identifier of the remote UE. In some examples, the paging identifier is the S-TMSI. In some examples, the core network node may transmit the paging message to the plurality of RAN nodes for paging of the remote UE within a corresponding plurality of cells associated with the plurality of RAN nodes. Here, each of the plurality of cells includes a respective one of a plurality of relay UEs, each having a respective relay link with the remote UE. For example, the paging management circuitry 1444, together with the communication and processing circuitry 1442 and transceiver 1410, shown and described above in connection with FIG. 14 may provide a means for transmitting the paging message.

In one configuration, the core network node 1400 includes various means as described in the present disclosure. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one of the FIG. 5, 7, or 8, and utilizing, for example, the processes and/or algorithms described herein in relation to FIG. 15.

Figure 16:
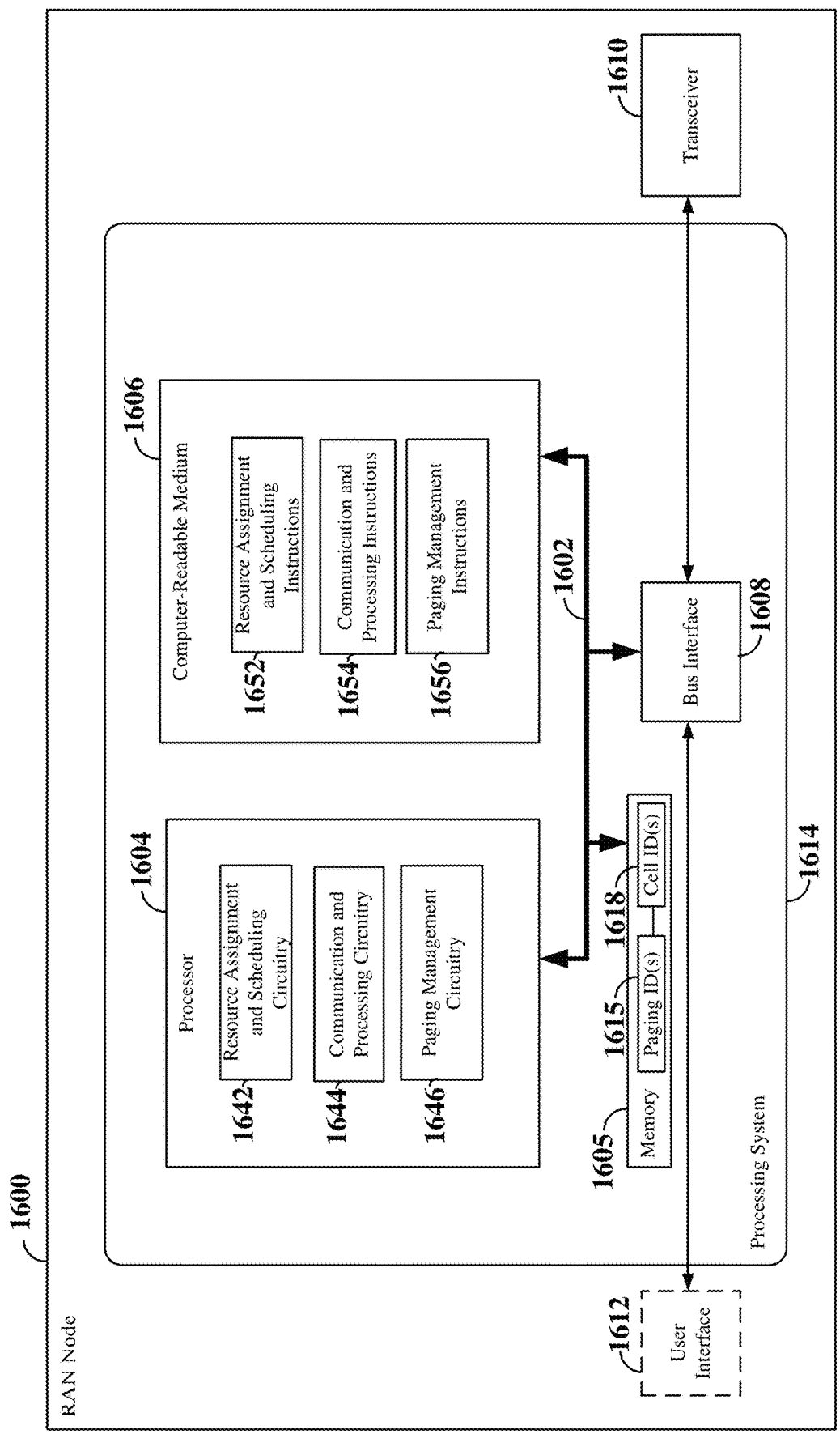
FIG. 16 is a block diagram illustrating an example of a hardware implementation for a radio access network (RAN) node employing a processing system according to some aspects

FIG. 16 is a conceptual diagram illustrating an example of a hardware implementation for an exemplary RAN node 1600 employing a processing system 1614. For example, the RAN node 1600 may correspond to any of the base stations (e.g., gNBs) or scheduling entities shown in any one or more of FIGS. 1 and/or 3-9.

In accordance with various aspects of the disclosure, an element, or any portion of an element, or any combination of elements may be implemented with a processing system 1614 that includes one or more processors 1604. The processing system 1614 may be substantially the same as the processing system 1014 illustrated in FIG. 10, including a bus interface 1608, a bus 1602, memory 1605, a processor 1604, and a computer-readable medium 1606. Furthermore, the RAN node 1600 may include an optional user interface 1612 and a transceiver 1610. The processor 1604, as utilized in a RAN node 1600, may be used to implement any one or more of the processes described below.

The processor 1604 may include resource assignment and scheduling circuitry 1642, configured to generate, schedule, and modify a resource assignment or grant of time—frequency resources (e.g., a set of one or more resource elements). For example, the resource assignment and scheduling circuitry 1642 may schedule time—frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1642 may be configured to allocate/schedule resources for the transmission of information to and reception of information from a relay UE configured to relay the information to and from a remote UE via a relay link (e.g., a sidelink). In addition, the resource assignment and scheduling circuitry 1642 may further be configured to allocate resources for sidelink communication between UEs (e.g., between the relay UE and the remote UE and/or neighbor relay UEs). In some examples, the resource assignment and scheduling circuitry 1642 may further be configured to schedule resources for the relay UE to transmit paging identifier(s) of the remote UE to the RAN node. The resource assignment and scheduling circuitry 1642 may further be configured to schedule resources for the transmission of a paging message for the remote UE to the relay UE. The resource assignment and scheduling circuitry 1642 may further be configured to execute resource assignment and scheduling instructions (software) 1652 stored in the computer-readable medium 1606 to implement one or more of the functions described herein.

The processor 1604 may further include communication and processing circuitry 1644 configured to communicate with at least one relay UE via Uu link. Each relay UE may be served by the same cell or different cells served by the RAN node 1600. The communication and processing circuitry 1644 may further be configured to communicate with a core network node (e.g., an AMF) within a 5G core network and with one or more other RAN nodes within the RAN. For example, the communication and processing circuitry 1644 may be configured to communicate with an anchor RAN node within the RAN or with one or more serving RAN nodes of relay UE(s) providing relay communication to the remote UE. In some examples, the communication and processing circuitry 1644 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1644 may be configured to receive paging identifier(s) of the remote UE from one or more relay UEs via the transceiver 1610. The communication and processing circuitry 1644 may further be configured to forward the paging identifier(s) of the remote UE to an anchor RAN node and/or to a core network node. The communication and processing circuitry 1644 may further be configured to store the paging identifier(s) 1615 of the remote UE, together with a respective cell (ID) 1618 of each cell including a relay UE that provided the paging identifier(s) of the remote UE within, for example, the memory 1605. The paging identifier(s) 1615 and associated cell ID(s) 1618 may be maintained, for example, as a cell ID table within the memory 1605.

The communication and processing circuitry 1644 may further be configured to receive a paging message for a remote UE from an anchor RAN node or a core network node. The communication and processing circuitry 1644 may further be configured to broadcast the paging message for the remote UE within the cell(s) associated with the paging identifier of the remote UE via the transceiver 1610. The communication and processing circuitry 1644 may further be configured to execute communication and processing instructions (software) 1654 stored in the computer-readable medium 1606 to implement one or more of the functions described herein.

The processor 1604 may further include paging management circuitry 1646, configured to optimize paging for a remote UE. In examples in which the RAN node is a serving RAN node serving one or more cells including relay UE(s) having respective relay links with a remote UE, the paging management circuitry 1646 may be configured to operate together with the communication and processing circuitry 1644 and transceiver 1610 to receive the paging identifier(s) of the remote UE from one or more relay UEs via respective Uu links. In some examples, the paging identifier(s) may include the S-TMSI when the remote UE is in an idle state. In this example, the paging management circuitry 1646 may further be configured to operate together with the communication and processing circuitry 1644 to forward the S-TMSI to the core network node. In addition, the paging management circuitry 1646 may be configured to receive a CN-initiated paging message for the remote UE from the core network node. The paging management circuitry 1646 may then be configured to operate together with the communication and processing circuitry 1644 and transceiver 1610 to transmit the paging message for the remote UE to the relay UE(s) within the cell(s) having cell IDs 1618 associated with the paging identifier 1615 of the remote UE. In this way, the paging management circuitry 1646 may page the remote UE within only the cell(s) including the relay UE(s) of the remote UE.

In some examples, the paging identifier(s) may include at least the I-RNTI when the remote UE is in an inactive state. In this example, the paging management circuitry 1646 may further be configured to operate together with the communication and processing circuitry 1644 to forward the I-RNTI (and in some examples the S-TMSI) to the anchor RAN node for the remote UE. In addition, the paging management circuitry 1646 may be configured to receive a RAN-initiated paging message for the remote UE from the anchor RAN node. The paging management circuitry 1646 may then be configured to operate together with the communication and processing circuitry 1644 and transceiver 1610 to transmit the paging message for the remote UE to the relay UE(s) within the cell(s) having cell IDs 1618 associated with the paging identifier 1615 of the remote UE. In this way, the paging management circuitry 1646 may page the remote UE within only the cell(s) including the relay UE(s) of the remote UE. In some examples, the paging management circuitry 1646 may further be configured to receive a page reject message from a relay UE that rejects the paging message when the remote UE is not registered with the relay UE. The serving RAN node may then be configured to forward the page reject message to the anchor RAN node and/or core network node to further optimize paging of the remote UE.

In examples in which the RAN node is an anchor RAN node, the paging management circuitry 1646 may be configured to receive the paging identifier(s) of the remote UE from the relay UE via a serving RAN node serving a cell including the relay UE when the remote UE is in an inactive state. In some examples, the paging identifier(s) includes the I-RNTI. In other examples, the paging identifier(s) may include both the I-RNTI and the S-TMSI. In this example, the paging management circuitry 1646 may further be configured to forward the S-TMSI of the remote UE to the core network node for error handling purposes. The paging management circuitry 1646 may further be configured to generate a RAN-initiated paging message for the remote UE and include the I-RNTI of the remote UE in the RAN-initiated paging message. The paging management circuitry 1646 may further be configured to forward the RAN-initiated paging message to the serving RAN node(s) serving cell(s) having cell IDs 1618 associated with the paging identifier 1615 of the remote UE. In this way, the paging management circuitry 1646 may page the remote UE within only the cell(s) including the relay UE(s) of the remote UE. The paging management circuitry 1646 may further be configured to execute paging management instructions (software) 1656 stored in the computer-readable medium 1606 to implement one or more of the functions described herein.

Figure 17:
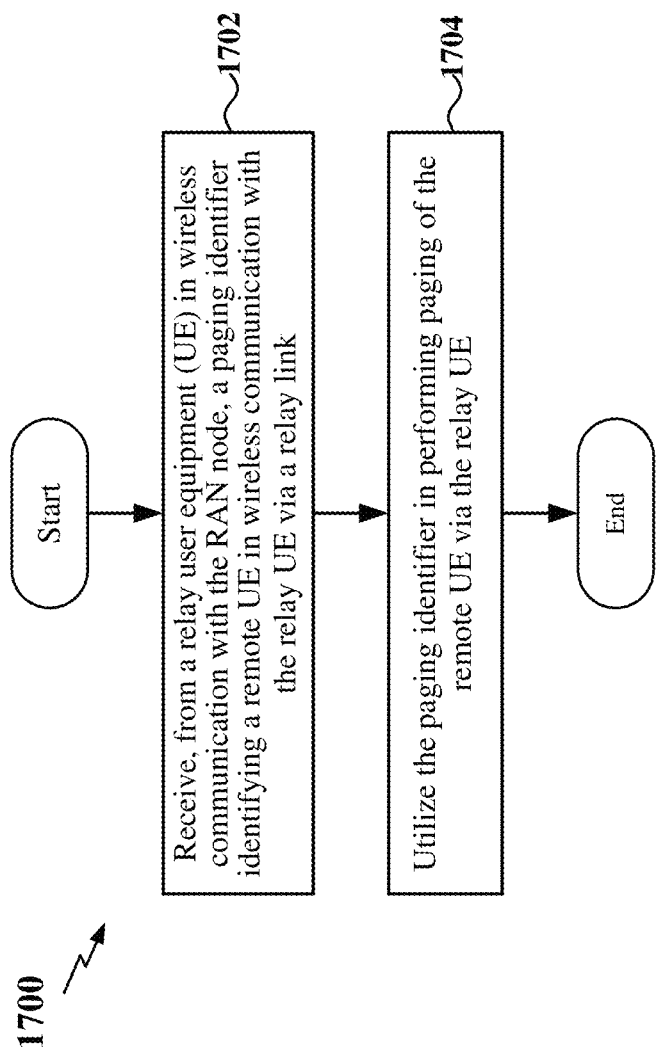
FIG. 17 is a flow chart of another exemplary process for paging optimization at a RAN node according to some aspects.

FIG. 17 is a flow chart of an exemplary process 1700 for paging optimization at a RAN node according to some aspects. As described below, some or all illustrated features may be omitted in a particular implementation within the scope of the present disclosure, and some illustrated features may not be required for implementation of all embodiments. In some examples, the process 1700 may be carried out by the RAN node 1600 illustrated in FIG. 16. In some examples, the process 1700 may be carried out by any suitable apparatus or means for carrying out the functions or algorithm described below.

At block 1702, the RAN node may receive, from a relay user equipment (UE) in wireless communication with the RAN node, a paging identifier identifying a remote UE in wireless communication with the relay UE via a relay link. In some examples, the RAN node may receive the paging identifier of the remote UE from at least one additional relay UE. In some examples, the RAN node is a serving RAN node serving a cell including the relay UE. In some examples, the paging identifier may include an S-TMSI. In this example, the serving RAN node may further forward the S-TMSI to a core network node (e.g., an AMF). In some examples, the paging identifier may include an I-RNTI. In this example, the serving RAN node may forward the I-RNTI to an anchor RAN node.

In some examples, the RAN node is the anchor RAN node. In this example, the anchor RAN node may receive the paging identifier of the remote UE from the relay UE via a serving RAN node serving a cell including the relay UE when the remote UE in an inactive state. In some examples, the paging identifier may include the I-RNTI. In some examples, the paging identifier may further include the S-TMSI. In some examples, the anchor RAN node may forward the S-TMSI to a core network node for error handling purposes. In some examples, the anchor RAN node may further receive the paging identifier of the remote UE from at least one additional serving RAN node serving at least one additional relay UE in wireless communication with the remote UE via at least one additional relay link. For example, the paging management circuitry 1646, together with the communication and processing circuitry 1644 and transceiver 1610, shown and described above in connection with FIG. 16 may provide a means to receive the paging identifier(s) of the remote UE.

At block 1704, the RAN node may utilize the paging identifier in performing paging of the remote UE via the relay UE. In examples in which the RAN node is the serving RAN node, the serving RAN node may receive a core network (CN)-initiated paging message for the remote UE from the core network node when the remote UE is in an idle state. The CN-initiated paging message may include the S-TMSI of the remote UE. The serving RAN node may further transmit the CN-initiated paging message to the relay UE for forwarding of the CN-initiated paging message to the remote UE. For example, the serving RAN node may broadcast the CN-initiated paging message within the cell including the relay UE. In some examples, the serving RAN node may receive the CN-initiated paging message from the core network node for paging of the remote UE within only a cell served by the RAN node that serves the relay UE.

In some examples, the serving RAN node may receive a RAN-initiated paging message for the remote UE when the remote UE is in an inactive state. The RAN-initiated paging message may include the I-RNTI of the remote UE. The serving RAN node may further transmit the RAN-initiated paging message to the relay UE for forwarding of the RAN-initiated paging message to the remote UE. For example, the serving RAN node may broadcast the RAN-initiated paging message within the cell including the relay UE. In some examples, the serving RAN node may receive the RAN-initiated paging message from an anchor RAN node for paging of the remote UE within only a cell served by the RAN node that serves the relay UE.

In some examples, the serving RAN node may transmit a paging message for the remote UE to the relay UE. The paging message may include the paging identifier of the remote UE. The serving RAN node may then receive a page reject message from the relay UE to reject the paging message when the remote UE is not registered with the relay UE.

In examples in which the RAN node is an anchor RAN node, the anchor RAN node may generate a RAN-initiated paging message for the remote UE. The RAN-initiated paging message may include the I-RNTI of the remote UE. The anchor RAN node may then forward the RAN-initiated paging message to the serving RAN node for paging of the remote UE within the cell including the relay UE. In some examples, the anchor RAN node may forward the RAN-initiated paging message to only the serving RAN node for paging of the remote UE within only the cell including the relay UE. The anchor RAN node may further forward the RAN-initiated paging message to at least one additional serving RAN node for paging of the remote UE within at least one additional cell served by the at least one additional serving RAN node. For example, the paging management circuitry 1646, together with the communication and processing circuitry 1644 and transceiver 1610, shown and described above in connection with FIG. 16 may provide a means for utilizing the paging identifier of the remote UE in performing paging of the remote UE via the relay UE.

In one configuration, the RAN node 1600 includes various means as described in the present disclosure. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one of the FIGS. 1, 2, and/or 3-9, and utilizing, for example, the processes and/or algorithms described herein in relation to FIG. 17.

The processes shown in FIGS. 11-13, 15, and 17 may include additional aspects, such as any single aspect or any combination of aspects described below and/or in connection with one or more other processes described elsewhere herein.

Aspect 1: A method for wireless communication at a relay user equipment (UE) in a wireless communication network, the method comprising: receiving, from a remote UE in wireless communication with the relay UE via a relay link, a paging identifier identifying the remote UE; and forwarding the paging identifier to a radio access network (RAN) node in wireless communication with the relay UE.

Aspect 2: The method of aspect 1, wherein the paging identifier comprises a serving temporary mobile subscriber identity (S-TMSI).

Aspect 3: The method of aspect 1 or 2, further comprising: receiving a core network (CN)-initiated paging message for the remote UE via the RAN node when the remote UE is in an idle state, wherein the CN-initiated paging message comprises the S-TMSI; and forwarding the CN-initiated paging message to the remote UE.

Aspect 4: The method of any of aspects 1 through 3, wherein the paging identifier comprises an inactive radio network temporary identifier (I-RNTI).

Aspect 5: The method of aspect 4, wherein the paging identifier further comprises an S-TMSI.

Aspect 6: The method of aspect 4, further comprising: receiving a radio access network (RAN)-initiated paging message from the RAN node for the remote UE when the remote UE is in an inactive state, wherein the RAN-initiated paging message comprises the I-RNTI of the remote UE; and forwarding the RAN-initiated paging message to the remote UE.

Aspect 7: The method of any of aspects 1 through 6, further comprising: maintaining a list of registered remote UEs including the remote UE; receiving a paging message from the RAN node for an additional remote UE, wherein the paging message comprises an additional paging identifier of the additional remote UE; and transmitting a page reject message to the RAN node to reject the paging message when the list of registered remote UEs does not include the additional paging identifier of the additional remote UE.

Aspect 8: The method of any of aspects 1 through 7, wherein the forwarding the paging identifier to the RAN node comprises: forwarding the paging identifier to another relay UE for forwarding of the paging identifier to the RAN node.

Aspect 9: A method for wireless communication at a relay user equipment (UE) in a wireless communication network, the method comprising: maintaining a list of registered remote UEs, each registered with the relay UE for relaying communication between the respective remote UE and a radio access network (RAN) node via a respective relay link; receiving a paging message from the RAN node for a remote UE, wherein the paging message comprises a paging identifier identifying the remote UE; and transmitting a page reject message to the RAN node to reject the paging message when the list of registered remote UEs does not include the paging identifier of the remote UE.

Aspect 10: The method of aspect 9, further comprising: forwarding the paging message to the remote UE when the list of registered remote UEs includes the paging identifier of the remote UE.

Aspect 11: The method of aspect 9 or 10, wherein the list of registered remote UEs comprises at least one respective paging identifier for each of the registered remote UEs.

Aspect 12: The method of aspect 11, wherein the at least one respective paging identifier comprises at least one of a serving temporary mobile subscriber identity (S-TMSI) or an inactive radio network temporary identifier (I-RNTI).

Aspect 13: The method of aspect 11, further comprising: receiving the at least one respective paging identifier from each of the registered remote UEs; and forwarding the at least one respective paging identifier for each of the registered remote UEs to the RAN node.

Aspect 14: The method of any of aspects 9 through 13, wherein the paging message is a core network (CN)-initiated paging message when the remote UE is in an idle state.

Aspect 15: The method of any of aspects 9 through 14, wherein the paging message is a RAN-initiated paging message when the remote UE is in an inactive state.

Aspect 16: A method for wireless communication at a radio access network (RAN) node in a wireless communication network, the method comprising: receiving, from a relay user equipment (UE) in wireless communication with the RAN node, a paging identifier identifying a remote UE in wireless communication with the relay UE via a relay link; and utilizing the paging identifier in performing paging of the remote UE via the relay UE.

Aspect 17: The method of aspect 16, wherein the paging identifier comprises a serving temporary mobile subscriber identity (S-TMSI).

Aspect 18: The method of aspect 17, further comprising: forwarding the S-TMSI to a core network node.

Aspect 19: The method of aspect 18, wherein the utilizing the paging identifier in performing paging of the remote UE comprises: receiving a core network (CN)-initiated paging message for the remote UE from the core network node when the remote UE is in an idle state, the CN-initiated paging message comprising the S-TMSI of the remote UE; and transmitting the CN-initiated paging message to the relay UE for forwarding of the CN-initiated paging message to the remote UE.

Aspect 20: The method of aspect 19, wherein the receiving the CN-initiated paging message further comprises: receiving the CN-initiated paging message from the core network node for paging of the remote UE within only a cell served by the RAN node, wherein the cell serves the relay UE.

Aspect 21: The method of any of aspects 16-21, wherein the paging identifier comprises an inactive radio network temporary identifier (I-RNTI) of the remote UE.

Aspect 22: The method of aspect 21, further comprising: forwarding the I-RNTI of the remote UE to an anchor RAN node.

Aspect 23: The method of aspect 21 or 22, wherein the utilizing the paging identifier in performing paging of the remote UE comprises: receiving a RAN-initiated paging message for the remote UE when the remote UE is in an inactive state, wherein the RAN-initiated paging message comprises the I-RNTI; and transmitting the RAN-initiated paging message to the relay UE for forwarding of the RAN-initiated paging message to the remote UE.

Aspect 24: The method of aspect 23, wherein the receiving the RAN-initiated paging message further comprises: receiving the RAN-initiated paging message from an anchor RAN node for paging of the remote UE within only a cell served by the RAN node, wherein the cell serves the relay UE.

Aspect 25: The method of aspect 16, wherein the RAN node is an anchor RAN node, and wherein the receiving the paging identifier comprises: receiving the paging identifier of the remote UE from the relay UE via a serving RAN node serving a cell including the relay UE when the remote UE is in an inactive state.

Aspect 26: The method of aspect 25, wherein the paging identifier comprises an inactive radio network temporary identifier (I-RNTI).

Aspect 27: The method of aspect 25 or 26, wherein the paging identifier further comprises a serving temporary mobile subscriber identity (S-TMSI).

Aspect 28: The method of aspect 26, wherein the utilizing the paging identifier in performing paging of the remote UE further comprises: generating a RAN-initiated paging message for the remote UE, wherein the RAN-initiated paging message comprises the I-RNTI; and forwarding the RAN-initiated paging message to the serving RAN node for paging of the remote UE within the cell including the relay UE.

Aspect 29: The method of aspect 28, wherein the forwarding the RAN-initiated paging message further comprises: forwarding the RAN-initiated paging message to only the serving RAN node for paging of the remote UE within only the cell including the relay UE.

Aspect 30: The method of aspect 28, further comprising: receiving the paging identifier of the remote UE from at least one additional serving RAN node serving at least one additional relay UE in wireless communication with the remote UE via at least one additional relay link, wherein the forwarding the RAN-initiated paging message further comprises: forwarding the RAN-initiated paging message to the at least one additional serving RAN node for paging of the remote UE within at least one additional cell served by the at least one additional serving RAN node.

Aspect 31: The method of aspect 27, further comprising: forwarding the S-TMSI to a core network node.

Aspect 32: The method of any of aspects 16 through 31, wherein the utilizing the paging identifier in performing paging of the remote UE comprises: transmitting a paging message for the remote UE to the relay UE, wherein the paging message comprises the paging identifier of the remote UE; and receiving a page reject message from the relay UE to reject the paging message when the remote UE is not registered with the relay UE.

Aspect 33: The method of any of aspects 16 through 32, further comprising: receiving the paging identifier of the remote UE from at least one additional relay UE in wireless communication with the RAN node.

Aspect 34: A method for wireless communication at a remote user equipment (UE) in a wireless communication network, the method comprising: establishing a respective relay link with a plurality of relay UEs for relaying communication between the remote UE and a radio access network (RAN) node via at least one of the plurality of relay UEs; providing a paging identifier identifying the remote UE to each of the plurality of relay UEs; and receiving at least one instance of a plurality of instances of a paging message for the remote UE, each of the plurality of instances being received from a respective one of the plurality of relay UEs, wherein the paging message comprises the paging identifier of the remote UE.

Aspect 35: The method of aspect 34, wherein the receiving the at least one instance of the paging message comprises: selecting a first instance of the plurality of instances of the paging message for receipt thereof, wherein the first instance is received from a first relay UE of the plurality of UEs.

Aspect 36: The method of aspect 35, further comprising: responding to the paging message via the first relay UE.

Aspect 37: The method of aspect 35 or 36, wherein the selecting the first instance comprises: selecting the first instance of the plurality of instances based on a respective channel quality of each of the respective relay links.

Aspect 38: The method of aspect 34, wherein the receiving at least one instance comprises: receiving each of the plurality of instances of the paging message to produce a combined paging message.

Aspect 39: A method of paging at a core network node within a core network, comprising: receiving, from a radio access network (RAN) node in a wireless communication network, a paging identifier of a remote user equipment (UE) in wireless communication with a relay UE via a relay link, wherein the RAN node serves a cell including the relay UE; and transmitting a paging message for the remote UE to the RAN node for paging of the remote UE within the cell served by the RAN node, wherein the paging message comprises the paging identifier of the remote UE.

Aspect 40: The method of aspect 39, wherein the paging identifier comprises a serving temporary mobile subscriber identity (S-TMSI).

Aspect 41: The method of aspect 39 or 40, wherein the receiving the paging identifier of the remote UE further comprises: receiving the paging identifier of the remote UE from a plurality of RAN nodes comprising the RAN node.

Aspect 42: The method of aspect 41, wherein the transmitting the paging message further comprises: transmitting the paging message to the plurality of RAN nodes for paging of the remote UE within a corresponding plurality of cells associated with the plurality of RAN nodes, each of the plurality of cells comprising a respective one of a plurality of relay UEs, each comprising a respective relay link with the remote UE.

Aspect 43: A user equipment (UE) configured for wireless communication comprising a processor; a memory communicatively coupled to the processor; and a transceiver communicatively coupled to the processor, wherein the processor and the memory are configured to perform a method of any one of aspects 1 through 15 or 34 through 38.

Aspect 44: A user equipment (UE) configured for wireless communication comprising at least one means for performing a method of any one of aspects 1 through 15 or 34 through 38.

Aspect 45: A radio access network (RAN) node configured for wireless communication comprising a processor; a memory communicatively coupled to the processor; and a transceiver communicatively coupled to the processor, wherein the processor and the memory are configured to perform a method of any one of aspects 16 through 33.

Aspect 46: A radio access network (RAN) node configured for wireless communication comprising at least one means for performing a method of any one of aspects 16 through 33.

Aspect 47: A core network node within a core network, comprising: a processor; a memory communicatively coupled to the processor; and a network interface communicatively coupled to the processor, wherein the processor and the memory are configured to perform a method of any one of aspects 39 through 42.

Aspect 48: A core network node within a core network comprising at least one means for performing a method of any one of aspects 39 through 42.

Aspect 49: An article of manufacture comprising a non-transitory computer-readable medium storing computer executable code comprising instructions for implementing a method of any one of aspects 1 through 42.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-10, 14, and/or 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication at a relay user equipment (UE) in a wireless communication network, the method comprising:
   receiving, from a remote UE in wireless communication with the relay UE via a relay link, paging information comprising a paging identifier identifying the remote UE and a paging cycle of the remote UE; and
   forwarding the paging identifier to a radio access network (RAN) node in wireless communication with the relay UE.

2. The method of claim 1, wherein the paging identifier comprises a serving temporary mobile subscriber identity (S-TMSI).

3. The method of claim 2, further comprising:
   receiving a core network (CN)-initiated paging message for the remote UE via the RAN node when the remote UE is in an idle state, wherein the CN-initiated paging message comprises the S-TMSI; and
   forwarding the CN-initiated paging message to the remote UE.

4. The method of claim 1, wherein the paging identifier comprises an inactive radio network temporary identifier (I-RNTI).

5. The method of claim 4, wherein the paging identifier further comprises an S-TMSI.

6. The method of claim 4, further comprising:
   receiving a radio access network (RAN)-initiated paging message from the RAN node for the remote UE when the remote UE is in an inactive state, wherein the RAN-initiated paging message comprises the I-RNTI of the remote UE; and
   forwarding the RAN-initiated paging message to the remote UE.

7. The method of claim 1, further comprising:
   maintaining a list of registered remote UEs including the remote UE;
   receiving a paging message from the RAN node for an additional remote UE, wherein the paging message comprises an additional paging identifier of the additional remote UE; and
   transmitting a page reject message to the RAN node to reject the paging message when the list of registered remote UEs does not include the additional paging identifier of the additional remote UE.

8. The method of claim 1, wherein the forwarding the paging identifier to the RAN node comprises:
   forwarding the paging identifier to another relay UE for forwarding of the paging identifier to the RAN node.

9. An apparatus at a user equipment (UE) configured for wireless communication, comprising:
   one or more processors; and
   one or more memories coupled to the one or more processors,
   wherein the one or more processors are configured to cause the UE to:
      receive, from a remote UE in wireless communication with the relay UE via a relay link, paging information comprising a paging identifier identifying the remote UE and a paging cycle of the remote UE; and
      forward the paging identifier to a radio access network (RAN) node in wireless communication with the relay UE.

10. The apparatus of claim 9, wherein the paging identifier comprises a serving temporary mobile subscriber identity (S-TMSI).

11. The apparatus of claim 10, wherein the one or more processors are further configured to cause the UE to:
receive a core network (CN)-initiated paging message for the remote UE via the RAN node when the remote UE is in an idle state, wherein the CN-initiated paging message comprises the S-TMSI; and
forward the CN-initiated paging message to the remote UE.

12. The apparatus of claim 9, wherein the paging identifier comprises an inactive radio network temporary identifier (I-RNTI).

13. The apparatus of claim 12, wherein the paging identifier further comprises an S-TMSI.

14. The apparatus of claim 12, wherein the one or more processors are further configured to cause the UE to:
receive a radio access network (RAN)-initiated paging message from the RAN node for the remote UE when the remote UE is in an inactive state, wherein the RAN-initiated paging message comprises the I-RNTI of the remote UE; and
forward the RAN-initiated paging message to the remote UE.

15. The apparatus of claim 14, wherein the one or more processors are further configured to cause the UE to:
determine one or more paging occasions within which to receive the RAN-initiated paging message for the remote UE based on the paging cycle of the remote UE.

16. The apparatus of claim 9, wherein the one or more processors are further configured to cause the UE to:
maintain a list of registered remote UEs including the remote UE;
receive a paging message from the RAN node for an additional remote UE, wherein the paging message comprises an additional paging identifier of the additional remote UE; and
transmit a page reject message to the RAN node to reject the paging message when the list of registered remote UEs does not include the additional paging identifier of the additional remote UE.

17. The apparatus of claim 9, wherein the one or more processors are further configured to cause the UE to:
forward the paging identifier to another relay UE for forwarding of the paging identifier to the RAN node.

18. An apparatus at a UE, comprising:
means for receiving, from a remote UE in wireless communication with the relay UE via a relay link, paging information comprising a paging identifier identifying the remote UE and a paging cycle of the remote UE; and
means for forwarding the paging identifier to a radio access network (RAN) node in wireless communication with the relay UE.

19. The apparatus of claim 18, wherein the paging identifier comprises a serving temporary mobile subscriber identity (S-TMSI).

20. The apparatus of claim 19, further comprising:
means for receiving a core network (CN)-initiated paging message for the remote UE via the RAN node when the remote UE is in an idle state, wherein the CN-initiated paging message comprises the S-TMSI; and
means for forwarding the CN-initiated paging message to the remote UE.

21. The apparatus of claim 18, wherein the paging identifier comprises an inactive radio network temporary identifier (I-RNTI).

22. The apparatus of claim 21, wherein the paging identifier further comprises an S-TMSI.

23. The apparatus of claim 21, further comprising:
means for receiving a radio access network (RAN)-initiated paging message from the RAN node for the remote UE when the remote UE is in an inactive state, wherein the RAN-initiated paging message comprises the I-RNTI of the remote UE; and
means for forwarding the RAN-initiated paging message to the remote UE.

24. The apparatus of claim 18, further comprising:
means for maintaining a list of registered remote UEs including the remote UE;
means for receiving a paging message from the RAN node for an additional remote UE, wherein the paging message comprises an additional paging identifier of the additional remote UE; and
means for transmitting a page reject message to the RAN node to reject the paging message when the list of registered remote UEs does not include the additional paging identifier of the additional remote UE.

25. The apparatus of claim 18, wherein the means for forwarding the paging identifier to the RAN node comprises:
means for forwarding the paging identifier to another relay UE for forwarding of the paging identifier to the RAN node.

* * * * *